United States Patent [19]

Reiners et al.

[11] Patent Number: 6,090,871
[45] Date of Patent: Jul. 18, 2000

[54] PAPER FINISHING AID

[75] Inventors: Jürgen Reiners, Leverkusen; Jürgen Kopp; Joachim König, both of Odenthal; Harro Träubel; Eckhard Wenderoth, both of Leverkusen; Bernhard Jansen, Köln; Joachim Probst, Leverkusen, all of Germany

[73] Assignee: Bayer Aktiengesellschaft, Leverkusen, Germany

[21] Appl. No.: 08/732,475

[22] PCT Filed: May 5, 1995

[86] PCT No.: PCT/EP95/01702

§ 371 Date: Nov. 5, 1996

§ 102(e) Date: Nov. 5, 1996

[87] PCT Pub. No.: WO95/31492

PCT Pub. Date: Nov. 23, 1995

[30] Foreign Application Priority Data

| May 30, 1994 | [DE] | Germany | 44 18 835 |
| May 30, 1994 | [DE] | Germany | 44 18 836 |
| May 11, 1994 | [DE] | Germany | 44 16 621 |
| Jun. 3, 1994 | [DE] | Germany | 44 19 572 |

[51] Int. Cl.[7] .......................... C08G 18/08; C08G 18/63; C08G 18/70; D21H 17/57
[52] U.S. Cl. ................. 524/27; 525/55; 525/100; 162/164.1; 162/164.3; 162/164.6
[58] Field of Search .................. 524/27; 525/55, 525/100; 162/164.6, 164.1, 164.3

[56] References Cited

U.S. PATENT DOCUMENTS

| 3,325,346 | 6/1967 | Osborg . |
| 3,589,978 | 6/1971 | Kamal et al. . |
| 3,989,659 | 11/1976 | Aldrich et al. . |
| 4,016,122 | 4/1977 | Matsuda et al. . |
| 4,096,127 | 6/1978 | Schurmann et al. . |
| 4,113,506 | 9/1978 | Sackmann et al. . |
| 4,306,998 | 12/1981 | Wenzel et al. . |
| 4,376,078 | 3/1983 | Töpfl . |
| 4,505,778 | 3/1985 | Robertson . |
| 4,522,686 | 6/1985 | Dumas . |
| 4,616,061 | 10/1986 | Henning et al. . |
| 4,670,100 | 6/1987 | Henning et al. . |
| 4,794,039 | 12/1988 | Shini . |
| 4,801,631 | 1/1989 | Sachs et al. . |
| 4,904,727 | 2/1990 | Probst et al. . |
| 5,503,714 | 4/1996 | Reiners et al. ................. 162/164.6 |

FOREIGN PATENT DOCUMENTS

| 0024296 | 3/1981 | European Pat. Off. . |
| 0234459 | 9/1987 | European Pat. Off. . |
| 0564912 | 10/1993 | European Pat. Off. . |
| 1496584 | 9/1967 | France . |
| 2360714 | 12/1976 | France . |
| 2360714 | 3/1978 | France . |
| 2839310 | 3/1980 | Germany . |
| 3718520 | 12/1988 | Germany . |
| 4211480 | 10/1993 | Germany . |
| 04119195 | 9/1990 | Japan . |
| 04146296 | 10/1990 | Japan . |
| 05050778 | 8/1991 | Japan . |
| 05051896 | 8/1991 | Japan . |
| 1487913 | 10/1977 | United Kingdom . |

*Primary Examiner*—Nathan M. Nutter
*Attorney, Agent, or Firm*—Sprung Kramer Schaefer & Briscoe

[57] ABSTRACT

This invention relates to compositions comprising a polyisocyanate having ionic groups or polyether groups and at least one member selected from the group consisting of a naturally occurring polymer, a polysiloxane graft copolymer, a water-dilutable synthetic polymer and a cationic polymer or a naturally occurring polymer and at least one member selected from the group consisting of a polysiloxane graft copolymer, a water-dilutable synthetic polymer and a cationic polymer.

4 Claims, No Drawings

PAPER FINISHING AID

This application is a PCT/EP95/01702 filed May 5, 1995, under 35 USC 371.

The invention relates to auxiliaries for paper finishing, i.e. sizing agents and wet and dry strength agents, which are based on polyisocyanates which contain ionic groups and/or polyether groups, preferably in the form of aqueous dispersions.

Polyamine-epichlorohydrin resins and polyamide-amine-epichlorohydrin resins have been employed for a long time for improving the dry and wet strength of paper. Cationic polycondensates with hydrophobic radicals, for example based on fatty acid-modified polyamines, are also suitable as sizing agents for paper. It is furthermore known that the strength of paper in the dry state can be increased by application of starch.

The use of starch on the surface also improves the printability of paper and generally increases surface strength.

Methods for chlorine-free wet strength treatment with water-dispersible polyisocyanates are known from the DE-OS (German Published Specifications) 42 11 480 and 42 26 110.

Binder systems for impregnation of paper which comprise polyisocyanates in blocked form are known from U.S. Pat. No. 3,531,429. The liberation of a split-off group is unsatisfactory to the user from the aspect of industrial hygiene.

U.S. Pat. No. 3,325,346 proposes reaction products of polyethyleneimines and polyisocyanates for improving wet strength and dry strength.

In DE 2 633 396, anionic aqueous PU dispersions are employed for improving the handle of paper. However, the multi-stage process is very expensive. The product contains no reactive NCO groups.

JP 80597 (800617) (Textilbericht reference No. 576/1981) discloses staining colours of acrylic copolymers and crosslinking agents based on, for example, polyisocyanates.

EP 250 598 describes pressure-sensitive recording materials for multiple use, in which use is made of copolymers having OH groups and polyisocyanates as adhesives.

JP 04119195 proposes combinations of alkyd resins and polyisocyanate crosslinking agents for the production of transparent paper. JP 04146296 also describes combinations of styrene-acrylate dispersions which serve the same purpose and impart to the paper an increased strength. Polyisocyanates are also employed as crosslinking agents there.

JP 05050778 and JP 05051896 propose blocked polyisocyanates ($NaHSO_3$ adducts) for improving the dry and wet strength of paper. Problems here are the release of SO, into the ambient air and corrosion on machine components. Furthermore, the cellulose fibres may be damaged.

Combinations of isocyanate and starch or polyvinyl alcohol are known, for example, from JP 80/159993.

FR-A 2 360 714 proposes a two-component system comprising a polyfunctional isocyanate and a compound containing active hydrogen which is reactive towards isocyanates for coating paper. The finished paper contains 0.5 to 35% by weight of reacted polyurethane. However, the polyfunctional isocyanates have the disadvantage that organic auxiliary solvents must be added in order to achieve adequate dispersion in water.

Resin acid isocyanates which can be dispersed in water in the presence of nonionic and anionic emulsifiers are known from DE-OS (German Published Specification) 2 557 409.

The dispersions or emulsions of carbamoylsulphonates from isocyanates and alkali metal and ammonium bisulphites proposed in DE-OS (German Published Specification) 2 839 310 can be employed as sizing compositions.

U.S. Pat. No. 4,505,778 discloses beater and surface sizing compositions which comprise mixtures of aromatic polyisocyanates containing 1–10% by weight of an isocyanate prepolymer which is obtained, for example, by reaction of aromatic polyisocyanates with monofunctional polyethers.

Various polyurethane or polyurea dispersions which can be employed as sizing compositions furthermore are known. However, these usually anionic products (cf. DE-OS (German Published Specification) 2 457 972) contain no reactive groups in the form of isocyanate groups. Examples of such products are to be found in the following documents: FR-A 1 496 584, U.S. Pat. No. 3,989,659, DE-OS (German Published Specification) 2 537 653, EP-A 37 379, DE-OS (German Published Specification) 3 438 5632and EP-A 207 414.

The problems with alkyl-ketene dimers as sizing agents are above all the low intrinsic retention and the poor sizing graduation. Cationic additives are necessary to improve the intrinsic retention of the resin. EP-A 74 544 discloses dispersions which comprise a disperse phase of 1. starch-treated resin size and 2. hydrophobic ketene dimer or hydrophobic isocyanates having at least 12 C atoms, a cationic dispersing agent (inter alia a polyamide-amine-epichlorohydrin resin) being employed to improve the properties.

Furthermore, it would be advantageous to the user to have a system of auxiliaries which imparts to the paper wet and dry strength and at the same time also well-graduated partial hydrophobicity, i.e. is suitable as a beater or surface sizing composition. For coated base papers of low weight per unit area etc., an increase in resistance to splitting and tear propagation is often also desired. There was therefore the object of providing a new process for wet and dry strength treatment and/or sizing of cellulose-containing material by means of a chlorine-free product which is based on non-blocked polyisocyanates which can be emulsified in water without addition of emulsifiers and can be employed in the pulp and on the surface.

There was furthermore the object of being able to control the sizing action better. In addition, the use properties of LWC coated base papers and newsprint papers were to be improved. Because of the ever lower weights per unit area, there is a great demand for products which increase the tear propagation and dry and wet strengths, and furthermore improve printability/writing properties.

It has been found, surprisingly, that with auxiliaries based on certain polyisocyanates these objectives can be achieved and that outstanding sizing effects in the sense of partial hydrophobization and papers having improved properties in respect of printability and strength are obtained. The auxiliaries according to the invention are preferably used for papermaking in the form of aqueous dispersions both for use in the pulp and for use on the surface.

The invention thus relates to compositions, preferably in the form of aqueous dispersions, comprising (I) a polyisocyanate (PI) having ionic groups and/or polyether groups and at least one member from the groups consisting of (II) a naturally occurring polymer (NP) from the group consisting of polysaccharides, (III) a polysiloxane graft copolymer (SP 1), (IV) a water-dilutable synthetic polymer (SP 2) and (V) a cationic polymer (SP 3) containing hydroxyl groups or (I) a polyisocyanate (PI) as above, (II) a naturally occurring polymer (NP) as above, and at least one member of the group consisting of (II), (IV) and (V)—in each case as above.

It is particularly surprising that the effects described above are synergistic, because the individual components of the auxiliaries result in no hydrophobic properties. Thus, Cobb values of >70 g/m² are achieved when the individual components are used. However, sizing can only be called significant at values of <40 g/m² (adsorption of water).

Water-dispersible polyisocyanates (I) which are suitable in the context of the invention are:

(Ia) polyisocyanate mixtures of
1) polyisocyanates which contain tertiary amino and/or ammonium groups and are free from polyether groups and
2) polyisocyanates E) which are free from ionic groups, tertiary amino groups and polyether groups, (Ib) polyisocyanate mixtures of
1) polyisocyanates which contain tertiary amino and/or ammonium groups and are free from polyether groups,
2) polyisocyanates E) which are free from tertiary amino groups, ionic groups and polyether groups,
3) polyisocyanates containing tertiary amino and/or ammonium groups and polyether groups and
4) polyisocyanates which contain polyether groups and are free from tertiary amino groups and ionic groups, (Ic) polyisocyanate mixtures of
1) polyisocyanates which contain polyether groups and are free from tertiary amino groups and ionic groups and
2) polyisocyanates E) which are free from tertiary amino groups, ionic groups and polyether groups,
or mixtures of polyisocyanate mixtures (Ia) to (Ib).

Polyisocyanates (I) which are preferably employed are those having

α) a content of isocyanate groups of 10–700 milliequivalents per 100 g of polyisocyanate, β) an average NCO functionality of ≧1.0, γ) a content of ethylene oxide units of 0 to 30% by weight, based on the polyisocyanate, the polyethylene oxide chains having an average molecular weight (number-average) of 100–3500, preferably 100–1000, particularly preferably 100–600 g/mol, and δ) a content of tertiary amino groups and/or ammonium groups of 50–5000 milliequivalents per 100 g of polyisocyanate.

Polyisocyanates (1) which are also preferably employed are those having

α) a content of isocyanate groups of 10–500 milliequivalents per 100 g of polyisocyanate, β) an average NCO functionality of 1.0 to 5.0, γ) a content of ethylene oxide units of 7 to 30% by weight, based on the polyisocyanate, the polyethylene oxide chains having an average molecular weight (number-average) of 100–3500, preferably 100–1000, particularly preferably 100–600 g/mol, and δ) a content of tertiary amino groups and/or ammonium groups of 0–1000 milliequivalents per 100 g of polyisocyanate.

In a further preferred embodiment, polyisocyanates I which have

α) a content of isocyanate groups of 47–595 milliequivalents, preferably 238–476 milliequivalents, based on 100 g of polyisocyanate, β) an average NCO functionality of 1.5 to 4.2, preferably 2.0–4.2, γ) a content of ethylene oxide units of 7 to 30% by weight, based on the polyisocyanate, the polyethylene oxide chains having an average molecular weight (number-average) of 10–3500, preferably 100–1000, particularly preferably 100–600 g/mol, and δ) a content of tertiary amino groups and/or ammonium groups of 1500 milliequivalents, preferably 5–300 milliequivalents, per 100 g of polyisocyanate are employed.

The NCO functionality values stated for the polyisocyanates are based on the value which can be calculated from the nature and functionality of the starting components according to the formula $$f = \frac{\sum \text{equivalents NCO} - \sum \text{equivalents OH}}{\sum \text{mol (NCO + OH)} - \sum \text{equivalents OH}}.$$

The content of isocyanate groups is in each case calculated as NCO having a molecular weight of 42 g/mol.

The polyisocyanates (I) are obtainable by reaction, in any desired sequence, of (II) (cyclo)aliphatic amines, which optionally contain ether, ester or amide groups, contain at least one group which is reactive towards isocyanates and contain at least one tertiary amino group and/or ammonium group, or mixtures thereof, and/or (III) polyalkylene oxide-polyether alcohols F) which are free from tertiary amino groups and ionic groups and optionally contain ester groups, with (IV) polyisocyanates E) which are free from tertiary amino groups, ionic groups and polyether groups, the ratio of equivalents of NCO groups employed in component (IV) to the sum of groups of components (III) and (II) which are reactive towards isocyanates being at least 1.05:1 to about 1000:1, preferably 4:1 to about 1000:1.

The polyisocyanates (I) employed are preferably obtainable by reaction of (II) A) amines which contain a group which is reactive towards isocyanates, of the formula

A1)

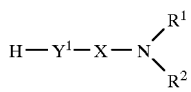

in which $Y^1$ for —O—, —NH— or —NR$_3$—, $R^3$ for methyl or ethyl,

X for $C_2$- to $C_{10}$-alkylene, $C_5$- to $C_{10}$-cycloalkylene, a radical of the formula $$-(CH-CH-O-)_a-CH-CH-$$
$$\phantom{-(}R^4\phantom{H-}R^5\phantom{O-)_a-}R^4\phantom{H-}R^5$$

or a radical of the formula $$-CH-CH_2-(O-CH-CH-)_a-$$
$$\phantom{-}|\phantom{H-CH_2-(O-}R^4\phantom{H-}R^5$$
$$\phantom{-}CH_2-(O-CH-CH-)_a-N-R^1$$
$$\phantom{-CH_2-(O-}R^4\phantom{H-}R^5\phantom{-}R^2$$

wherein $R^4$, $R^5$ independently of one another hydrogen or methyl, with the condition that at least one of the radicals represents hydrogen, a values from 0 to 10, $R^1$ and $R^2$ a) independently of one another denote $C_1$–$C_4$-alkyl or $C_3$-$C_6$-cycloalkyl, b) independently of one another denote a radical of the formula $$-(CH-CH-O-)_a-CH-CH-O-R^6$$
$$\phantom{-(}R^4\phantom{H-}R^5\phantom{O-)_a-}R^4\phantom{H-}R^5$$

c) independently of one another denote a $C_2$–$C_4$-alkyl radical, substituted by one or more tertiary amino groups and/or ammonium groups, of the formulae $$-CH_2-CH_2-(CH_2)_b-N \begin{Bmatrix} [(CH_2)_q-CH_2-N{\overset{R^6}{\underset{}{}}}]_r R^6 \\ [(CH_2)_t-CH_2-N{\underset{R^6}{\overset{}{}}}]_s R^6 \end{Bmatrix}$$

or $$-CH_2-CH_2-(CH_2)_b-N\diagup\diagdown N-[(CH_2)_q-CH_2-N{\overset{R^6}{\underset{}{}}}]_r R^6$$

or d) together with the N atom to which they are bonded denote a 5- or 6-membered ring of the formula $$-N\begin{matrix} CH_2-CH_2 \\ \phantom{N}\diagdown\phantom{H_2}Z \\ CH_2-CH_2 \end{matrix}$$

Z for $$\diagdown O \quad \text{or} \quad \diagdown N-(CH_2-CH_2-N{\underset{}{\overset{R^6}{|}}})_m-R^6$$

or a single bond or $$\diagdown N-(CH-CH-O-)_a-CH-CH-O-R^6$$
$$\phantom{\diagdown N-(}R^4\phantom{H-}R^5\phantom{O-)_a-}R^4\phantom{H-}R^5$$

$R^6$ denotes methyl or ethyl, b denotes values of 0 to 2, q, t independently of one another denote values of 1 or 2, m, r, s independently of one another denote values from 0 to 3, or A2) of the formula $$H-Y^2-CH\begin{matrix}(CH_2)_p\\ \diagdown \\ \diagup\\ (CH_2)_n\end{matrix}N-R^1$$

wherein $Y^2$ represents —O—, —NH— or $NR^3$—, where $R^3$ has the abovementioned meaning, n and p independently of one another assume values of 1 or 2 and $R^1$ has the abovementioned meaning, or

A3) of the formula $$H-N\begin{matrix}(CH_2)_p\\ \diagdown \\ \diagup\\ (CH_2)_n\end{matrix}N-R^1$$

wherein n, p and $R^1$ have the abovementioned meanings, or

A4) of the formula

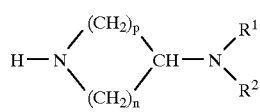

wherein
n, p, $R^1$ and $R^2$ have the abovementioned meanings, or
B) amines which contain more than one group which is reactive towards isocyanates and optionally ether and/or ester and/or amide groups and have a molecular weight of less than 10,000 g/mol, or
C) the compounds which are obtained by reaction of A) or B) by protonation and/or quaternization, contain ammonium groups and are reactive towards isocyanates,
or
any desired mixtures of A) to C),
and/or of
(III) mono- or polyfunctional polyalkylene oxide-polyether alcohols F) which contain a statistical average of 5.0 to 70 ethylene oxide units and optionally contain ester groups, with
(IV) a polyisocyanate E) which is free from tertiary amino groups, ionic groups and polyether groups, or a mixture of several such polyisocyanates E), having
an average NCO functionality of 2.0 to 8.0, preferably 2.0 to 6.0, particularly preferably 2.1–4.4, and in particular 2.3 to 4.3, and
a content of isocyanate groups of 10 to 50% by weight, preferably 19 to 24% by weight, based on component (IV),
in any desired sequence.

The polyisocyanates (I) are water-dispersible.

The term "water-dispersible" in connection with the polyisocyanates (I) means that they are polyisocyanates which, in a concentration of 0.1 to 70% by weight, preferably 0.1 to 50% by weight, especially 0.1 to 30% by weight, in water, give finely divided dispersions having average particle diameters (ultracentrifuge) of <500 nm, do not sediment and do not cream.

The corresponding polyisocyanate mixtures which are obtainable by protonation and/or quaternization of the water-dispersible polyisocyanates (I) to be employed according to the invention and contain ammonium groups are also suitable for carrying out the process according to the invention. Alkylating agents, such as, for example, dimethyl sulphate, diethyl sulphate or $C_1$–$C_4$-alkyl halides and -alkylsulphonates, can be used for the quaternization.

Examples of amines II A) which may be mentioned are:

N,N-dimethylethylenediamine, dimethylaminohydroxyethane, dimethylaminohydroxypropane, diethylaminohydroxyethane, dibutylaminohydroxyethane, diethylaminoethoxyhydroxyethane, (2-diethylaminoethoxy)-ethoxyhydroxyethane, N,N'-triethyl-N'-[ω-hydroxy-tetraethoxyethyl]propylenediamine, N-hydroxyethylpiperidine, N-hydroxyethylpyrrolidine, 4-hydroxy-1-dimethylaminocyclohexane, 1,3-bis(dimethylaminoethoxy)-2-hydroxypropane, 1,3-bis(dimethylamino-propoxy)-2-hydroxypropane and the amines of the following formulae:

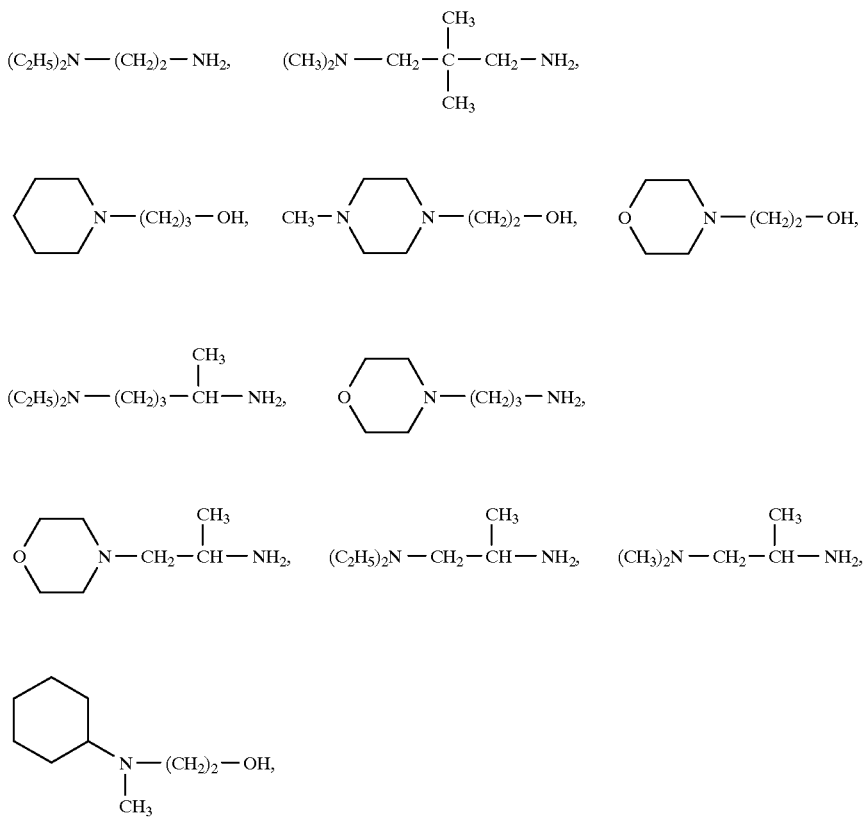

-continued
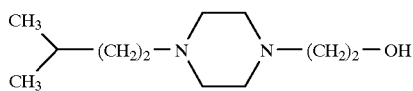
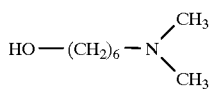
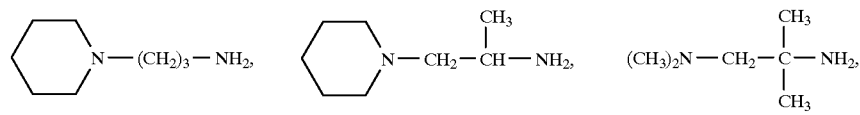
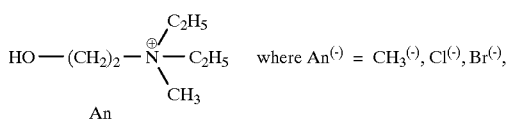  where An$^{(-)}$ = CH$_3$$^{(-)}$, Cl$^{(-)}$, Br$^{(-)}$,
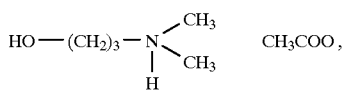  CH$_3$COO,
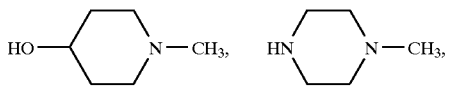
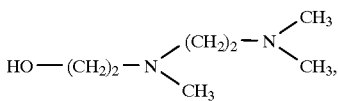
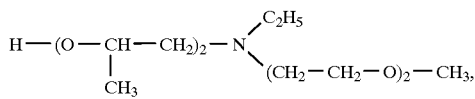
where n = 1 - 10
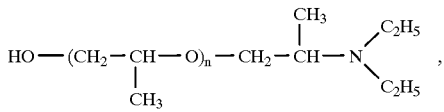
where n = 1 - 10

-continued
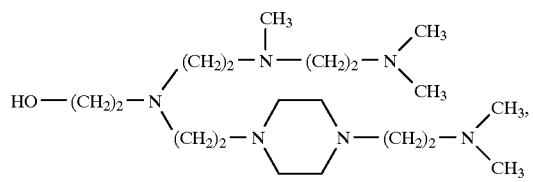
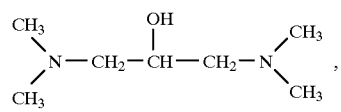
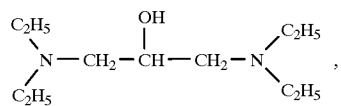
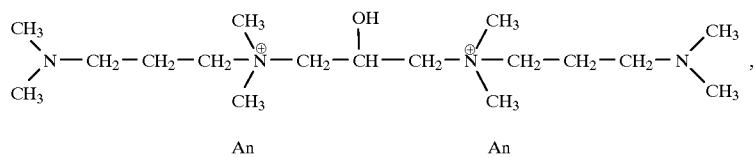
where An$^{(-)}$ = Cl$^{(-)}$, Br$^{(-)}$, CH$_3$OSO$_3^{(-)}$,
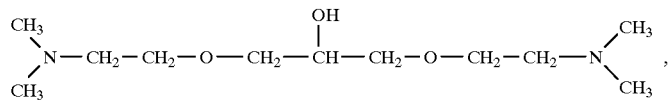
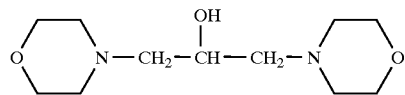
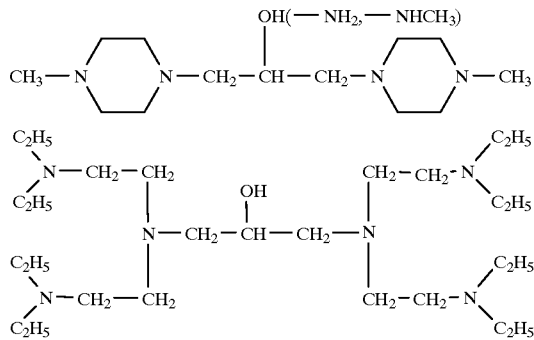
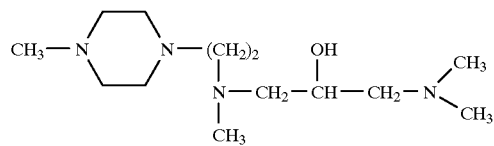

The amines II A) also comprise, for example, the following amino alcohols:

methyl-bis(2-hydroxyethyl)-amine, methyl-bis(2-hydroxypropyl)-amine, N,N'-bis(2-hydroxyethyl)-N,N'-dimethyl-ethylenediamine, N,N"-bis(2-hydroxyethoxyethyl)-N,N',N"-trimethyl-diethylenetriamine, N,N-dimethylamino-propyl-bis[ω-hydroxytetraethoxyethyl]amine, triethanolamine, reaction products of triethanolamine with 3 to 20 mol of ethylene oxide and/or propylene oxide per mol of amine, reaction products of polyamines, such as aminoethylpiperazine, triethylenetetramine and bis(2-aminoethyl)piperazine, with ethylene oxide and/or propylene oxide, diethylenetriamine-bispropionamide, N,N'-bis-propionylaminoethyl-N"-(2-hydroxyethyl) amine and reaction products of tetramethylethylenediamine-dichloroethane condensates with ethylene oxide and/or propylene oxide.

Suitable amines II) B) are, for example, the following polycondensates:

a) polyesters containing terminal hydroxyl groups which are prepared by condensation of $C_2$- to $C_8$-dicarboxylic acids, polyethylene oxide and/or polypropylene oxide or copolyethers of ethylene oxide and propylene oxide, and dihydroxyalkylamines, preferably N-methyl-diethanolamine or N-methyl-diisopropanolamine, and have an OH functionality of 2, b) polyesters containing terminal hydroxyl groups which are prepared by condensation of $C_2$- to $C_8$-dicarboxylic acids and the dihydroxyalkylamines listed under a), and have an OH functionality of 2, c) polyester-amides containing terminal hydroxyl or amino groups, from $C_2$- to $C_8$-dicarboxylic acids, $C_2$- to $C_6$-diaminoalkanes, preferably ethylenediamine, and the dihydroxyalkylamines listed under a), and having an OH functionality of 2, d) polyesters containing terminal hydroxyl groups, from $C_2$- to $C_8$-dicarboxylic acids, trihydroxyalkanes, preferably trimethylolpropane and reaction products thereof with 1–10 mol of ethylene oxide or propylene oxide, and the dihydroxyalkylamines listed under a), having a functionality of more than 2, e) polyamines containing hydroxyl functional groups, which are obtainable by reaction of ammonia or of linear or branched (poly)alkylene-polyamines, such as, for example, ethylenediamine, diethylenetriamine, triethylenetetramine, bis(3-aminopropyl)-methylamine, or α,ω-polyether-diamines with a primary or secondary amino group, or condensates thereof with less than the molar amount of dihalogenoalkanes such as dichloroethane, with alkylene oxides, preferably triethanolamine, tris(2-hydroxypropyl)amine, tetrakis(2-hydroxypropyl)-ethylenediamine, f) polyamide-amines containing hydroxyl functional groups, which are obtainable by reaction of linear or branched polycondensates of $C_2$- to $C_8$-dicarboxylic acids, diamines and polyamines, containing at least three acylatable amino groups, such as diethylenetriamine or triethylenetetramine, and/or polyamines containing at least two acylatable amino groups and further tertiary amino groups, such as bis-(3-aminopropyl) methylamine, and if appropriate caprolactam or optionally polyether-diols or polyether-diamines, with alkylene oxides, 1–3 mol of alkylene oxide being employed per primary and secondary amino group in the polycondensate, g) polyamide-amines containing hydroxyl functional groups according to f), which contain hydroxyethyl end groups and instead of the reaction with alkylene oxides are obtainable by cocondensation with ethanolamine, h) amino alcohols of the formula $$H-(O-CH-CH)_k-NR^8-[(CH_2)_d-CH_2-CH_2-NR^7]_g-(CH-CH-O)_c-H$$
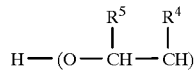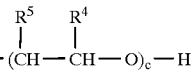

wherein $R^4$ and $R^5$ represent hydrogen or methyl, with the proviso that at least one radical represents hydrogen, $R^8$ and $R^7$ independently of one another represent methyl, ethyl or a radical of the formula $$-(CHR^5-CHR^4-O)_f-H \text{ or } [CH_2-(CH_2)_g-NR^1]_hR^2,$$

in which $R^1, R^2, R^4, R^5$ have the abovementioned meanings, and g assumes values from 1 to 6, h represents zero to 4, k, c and f assume values from 0 to 20, e assumes values from 0 to 3 and d assumes the values 0 or 1.

The amines II) B) preferably have an average molecular weight of less than 10,000 g/mol. Those having an average molecular weight of less than 5000 g/mol, in particular less than 3000 g/mol, are particularly preferred.

Suitable amines II) C) are, for example, the amines which are obtainable by reaction of acids or alkylating agents with the components II) A) or II) B) and in which all or some of the tertiary amino groups have been converted into ammonium groups.

Acids which are suitable for this reaction are preferably acetic acid, formic acid and HCl; possible alkylating agents are, for example, $C_1$–$C_4$-alkyl chlorides and bromides, as well as dialkyl sulphates, such as dimethyl sulphate or diethyl sulphate.

The polyisocyanates E) mentioned under IV), which are free from tertiary amino groups, ionic groups and polyether groups, are any desired polyisocyanates which have a uretdione and/or isocyanurate, urethane and/or allophanate, biuret or oxadiazine structure and are prepared by modification of simple, preferably (cyclo)aliphatic diisocyanates, such as are described by way of example in DE-OS (German Published Specification) 1 670 666, 3 700 209 and 3 900 053 or EP-A 336 205 and 339 396 for example. Suitable polyisocyanates E) are also polyisocyanates containing ester groups, for example the tetrakis- and tris-isocyanates accessible by reaction of pentaerythritol- or trimethylolpropanesilyl ethers with isocyanatocaproyl chloride (cf. DE-A 3 743 782). It is furthermore also possible to use triisocyanates, such as, for example, tris-isocyanatodicyclohexylmethane.

Suitable diisocyanates for the preparation of the polyisocyanates E) which are free from tertiary amino groups, ionic groups and polyether groups are in principle those having a molecular weight range from 140 to 400 and with (cyclo) aliphatically bonded isocyanate groups, such as, for example, 1,4-diisocyanatobutane, 1,6-diisocyanatohexane, 1,5-diisocyanato-2,2-dimethylpentane, 2,2,4- and 2,4,4-trimethyl-1,6-diisocyanatohexane, 1,3- and 1,4-diisocyanatocyclohexane, 1-isocyanato-3,3,5-trimethyl-5-isocyanatomethyl-cyclohexane, 1-isocyanato-1-methyl-4-isocyanatomethyl-cyclohexane and 4,4'-diisocyanatodicyclohexyl-methane, or any desired mixtures of such diisocyanates.

The polyisocyanates E) which are free from tertiary amino groups, ionic groups and polyether groups are preferably polyisocyanate mixtures which consist essentially of trimeric 1,6-diisocyanatohexane or 1-isocyanato-3,3,5-trimethyl-5-isocyanatomethyl-cyclohexane and optionally dimeric 1,6-diisocyanatohexane or 1-isocyanato-3,3,5-trimethyl-5-isocyanatomethyl-cyclohexane and the corresponding higher homologues and contain isocyanurate groups and optionally uretdione groups, and have an NCO content of 19 to 24% by weight. Polyisocyanates which are particularly preferably employed as component E) are the corresponding polyisocyanates which are largely free from uretdione groups, contain isocyanurate groups and have the NCO content mentioned, such as are obtained by catalytic trimerization, which is known per se, with isocyanurate formation, of 1,6-diisocyanatohexane or 1-isocyanato-3,3,5-trimethyl-5-isocyanatomethyl-cyclohexane and which preferably have an (average) NCO functionality of 3.2 to 4.2. Preferred components E) are also the trimeric polyisocyanates which are obtained by reaction of 1,6-diisocyanatohexane with less than the molar amount of water in a known manner, essentially contain biuret groups and have an NCO content of 19 to 24% by weight. Components E) with allophanate groups and isocyanurate groups, such as are obtained by catalytic trimerization of urethane isocyanates with an excess of diisocyanate, as well as polyisocyanates containing oxadiazinetrione structures, such as, for example,

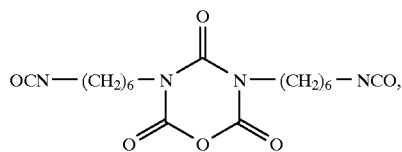

and trimers thereof are also preferred.

Other suitable, although not preferred, polyisocyanates E) are aliphatic or aromatic diisocyanates, such as hexamethylene diisocyanate, tolylene diisocyanate, 1,5-diisocyanatonaphthalene, diphenylmethane diisocyanate and higher homologues thereof with uretdione, isocyanurate, allophanate and biuret groups etc.

Preferred polyisocyanates E) are also those which are obtained from diisocyanates and urethane derivatives thereof in a manner known per se by trimerization/allophanate formation. These have a particularly low viscosity of <5000 mPa.s/23° C.

Polyisocyanates E) which have a viscosity of <4000 mPa.s, in particular <2000 mPa.s, at 23° C. are particularly preferred.

The polyalkylene oxide polyether alcohols F) mentioned under III are mono- or polyfunctional polyalkylene oxide polyether alcohols which contain a statistical average of 5 to 70, preferably 6 to 60, ethylene oxide units per molecule, such as are accessible in a manner known per se by alkoxylation of suitable starter molecules.

Any desired mono- or polyhydric alcohols of the molecular weight range from 32 to 150 g/mol, such as are also used for example according to EP-A 206 059, can be employed as starter molecules for the preparation of the polyalkylene oxide polyether alcohols F). Monofunctional aliphatic alcohols having 1 to 4 carbon atoms are preferably used as starter molecules. The use of methanol is particularly preferred.

Alkylene oxides which are suitable for the alkoxylation reaction are, in particular, ethylene oxide and propylene oxide, which can be employed in the alkoxylation reaction in any desired sequence or else as a mixture.

The polyalkylene oxide polyether alcohols F) are preferably either pure polyethylene oxide polyethers or mixed polyalkylene oxide polyethers which have at least one polyether sequence having at least 5, in general 5 to 70, preferably 6 to 60, and particularly preferably 7 to 20, ethylene oxide units, the alkylene oxide units of which consist of ethylene oxide units to the extent of at least 60 mol %, preferably to the extent of at least 70 mol %.

Preferred polyalkylene oxide polyether alcohols F) are monofunctional polyalkylene oxide polyethers which are started on an aliphatic alcohol containing 1 to 4 carbon atoms and contain a statistical average of 6 to 60 ethylene oxide units. Particularly preferred polyalkylene oxide polyether alcohols F) are pure polyethylene glycol monomethyl ether alcohols which contain a statistical average of 7 to 20 ethylene oxide units.

Suitable polyalkylene oxide polyethers F) containing ester groups are polyester ethers containing OH terminal groups, which are obtainable by reaction of aliphatic $C_2$- to $C_8$-dicarboxylic acids or esters or acid chlorides thereof with polyethers from the group consisting of polyethylene oxides, polypropylene oxides and mixtures thereof or copolyethers thereof, 0.6 to 0.99 equivalent of carboxyl groups or derivatives thereof being employed per OH equivalent of the polyether, and which have an average molecular weight of less than 10,000 g/mol, preferably less than 3000 g/mol, and contain hydroxyl end groups.

In the case where the amines or amino alcohols II) A) to II) C) contain polyether chains, reaction of A) and/or B) and/or C) with the polyisocyanates E) can also lead directly to water-dispersible polyisocyanates, so that the content of component F) can be reduced if appropriate.

The polyisocyanates (I) to be employed according to the invention can also be employed in combination with external ionic or nonionic emulsifiers. Such emulsifiers are described, for example, in "Methoden der Organischen Chemie" (Houben-Weyl), Volume XIV/1, Part 1, pages 190–208, Georg Thieme-Verlag, Stuttgart (1961), in U.S. Pat. No. 3,428,592 or in EP-A 13 112. The emulsifiers are employed in an amount which guarantees dispersibility.

The reaction of components A) and/or B) and/or C) and/or F) with components E) is carried out in any desired sequence with exclusion of moisture, preferably without a solvent. As the amount of alcohol component employed increases, a higher viscosity of the end product is achieved, so that in certain cases which are not preferred (when the viscosity rises, for example, above 100 Pa.s) a solvent which is preferably miscible with water but is inert towards the polyisocyanate can be added. Suitable solvents are: alkyl ether-acetates, glycol diesters, toluene, carboxylic acid esters, acetone, methyl ethyl ketone, tetrahydrofuran and dimethylformamide. The reaction can be accelerated by co-using catalysts which are known per se, such as dibutyltin dilaurate, tin-(II) octoate or 1,4-diazabicyclo[2.2.2]octane, in amounts of 10 to 1,000 ppm, based on the reaction components. A catalyst-free reaction is preferred.

The reaction can be carried out in the temperature range up to 130° C., preferably in the range between 10° C. and 100° C., in particular between 20° C. and 80° C. The reaction can be monitored by titration of the NCO content or by measurement of the IR spectra and evaluation of the carbonyl band at about 2,100 cm$^{-1}$, and has ended when the isocyanate content is no more than 0.1% by weight above the value achieved with complete conversion for the given stoichiometry. Reaction times of less than 24 hours are as a rule sufficient. Solvent-free synthesis of the polyisocyanates to be employed according to the invention is preferred.

In an embodiment which is not preferred, it is also possible to prepare the polyisocyanates (I) to be employed according to the invention by mixing 1) polyisocyanates E) which are free from tertiary amino groups, ionic groups and polyether groups, 2) polyisocyanates which are obtained by reaction of polyisocyanates E) with the amines mentioned under II), the ratio of the equivalents of the groups of I) which are reactive towards isocyanates to the NCO groups employed in component II) being 1:1 to 1:1000, and 3) polyisocyanates which are obtained by reaction of polyisocyanates E) with polyalkylene oxide polyether alcohols F), the ratio of the equivalents of the groups of component III) which are reactive towards isocyanates to the NCO groups employed in component 1) being 1:1 to 1:1000.

The number of amine equivalents, the polyether content, the NCO content and the NCO functionality can be adjusted here by the expert, by appropriate weighing, such that the resulting mixture has the composition necessary for water-dispersibility, the preferred ranges already mentioned applying. However, the dispersibility is not as good as in the case of reaction in a mixture.

The polyisocyanates I can also be modified anionically. Such anionically modified polyisocyanates are obtainable, for example, by reaction of hydroxycarboxylic acids or hydroxysulphonic acids and, if appropriate, the polyalkylene oxide-polyether alcohols F described above under (III) with the polyisocyanates E described above under (IV). Hydroxycarboxylic acids and hydroxysulphonic acids which are suitable for this purpose comprise, for example, the compounds:

a) hydroxycarboxylic acids, such as lactic acid, trichlorolactic acid, dimethylolpropionic acid, malic acid, dihydroxymaleic acid, dihydroxyfumaric acid, tartaric acid, dihydroxytartaric acid, mucic acid, saccharic acid, citric acid, salicylic acid, 2,6-dihydroxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, hydroxyterephthalic acid, 5,6,7,8-tetrahydronaphth-2-ol-3-carboxylic acid, 1-hydroxy-2-naphthoic acid, 2,8-dihydroxy-3-naphthoic acid, β-hydroxypropionic acid and m-hydroxybenzoic acid, b) hydroxysulphonic acids, such as 2-hydroxyethanesulphonic acid, phenol-2-sulphonic acid, phenol-3-sulphonic acid, phenol-4-sulphonic acid, phenol-2,4-disulphonic acid, naphth-1-ol-sulphonic acid, naphth-1-ol-disulphonic acid, 8-chloronaphth-1-ol-disulphonic acid, naphth-1-ol-trisulphonic acid, naphth-2-ol-1-sulphonic acid, naphth-2-ol-trisulphonic acid, 1,7-dihydroxynaphthalene-2-sulphonic acid, 1,8-dihydroxynaphthalene-2,4-disulphonic acid, and sulphonate alcohols containing ethoxy or polyethoxy groups, such as are described, for example, in DE-OS (German Published Specification) 24 46 440. Monohydric alcohols containing ionic groups are preferred as starting materials for the preparation of cationically and anionically modified polyisocyanates I.

The water-dispersible polyisocyanates (I) to be employed according to the invention are easy to handle industrially and, with exclusion of moisture, have a storage stability of months.

Description of the Naturally Occurring Polymers (NP)

The naturally occurring polymers (NP) preferably comprise starch, cellulose, hemicellulose, chitosan, xanthan, agar, galactomannan, carrageenan, pectin, alginate, plant gum and derivatives thereof Starch types from potato, maize and wheat, cationic and anionic derivatives thereof, and also amphoteric starches and hydrophobically modified starches are suitable. Cellulose ethers, which should preferably be soluble in cold water, for example hydroxyethylcellulose, carboxymethylcellulose and hydroxypropylcellulose, are furthermore suitable.

Galactomannans, agar, pectin, alginates, carrageenan, chitosans, xanthan, plant gum and derivatives thereof are also suitable. Commercially available starch (derivatives), such as enzymatically or thermally degraded natural starch or cationically, anionically or amphoterically modified starches, are particularly preferred.

Methods of starch processing are known from the literature (cf., for example, Wochenblatt fur Papierfabrikation, pages 109–134 and 140–167 (1991)).

For pulp starch, the amount is about 1% by weight, based on the paper, and for surface starch the amount is about 5% by weight, based on paper.

An overview of the use of starch in the paper industry can be found in the following literature references:

1) Ullmanns Enzyklopädie der technischen Chemie, Volume 22, page 165 et seq. (1982)

2) Wochenblatt für Papierfabrikation 119(5), pages 149–156/157–160 (1991)

3) Das Papier, 10 A, pages V40 et seq. (1993).

The paper industry is interested in specific starch products for the production of paper and card. For example, natural starch is very inexpensive, but because of its high amylose content, tends towards retrogradation; as a consequence, a reduced film thickness, high sludge formation and rapid contamination of the application units often result. Too high a viscosity of the starch leads to application problems (splashing), and too low a viscosity results in complete impregnation of the paper and poor surface properties in the case of surface application.

Cationic starches are preferred for use in the pulp, because they can be absorbed onto the fibre to the extent of up to 90% and result in low pollution of the waste water and of the paper machine circulation.

However, derivatization of the starch is associated with costs. Nevertheless, advantages result with cationic starches because they produce less COD in the waste water and remain on the fibre during reprocessing of waste paper.

Anionic starches act like trash in the resulting pulp system during reprocessing of waste paper.

There is therefore still a demand for improved paper finishing agents which do not have the disadvantages mentioned.

Cationic-hydrophobic wax maize starches which combine the advantages of cationic surface starches with the sizing properties according to the Hercules size test and the Cobb test are known (EP 277633, EP 406837). Expensive staining colour can be saved, for example in the case of coated base papers, by reducing the penetration of the staining colour. An increase in surface strength can also be achieved with such starch types (R. Sirois, Wochenblatt für Papierfabrikation (10), page 402 et seq. (1993). A disadvantage is that a certain starch pretreatment/derivatization is necessary for each requirement.

Cationic starches are unsuitable as trash collectors in pulp systems with a high trash load, since the degrees of substitution must be much higher than in commercially available starches (N. O. Bergh et al, Wochenblatt für Papierfabrikation 5, pages 162–170 (1993). The use of cationic polymers such as poly-DADMAC as trash collectors is therefore proposed.

JP 79/034408 describes surface sizing compositions comprising a graft polymer of starch and a COOH-containing vinyl monomer.

Compounds which contain organic halogen are often employed as cationizing reagents for pulp starch. Methods which allow derivatization of starch with chlorine-free reagents are therefore in particular demand.

The composition according to the invention allows wide possibilities of variation, depending on whether sizing or strength improvements or both are desired.

Description of the Synthetic Polymers (SP)

Dispersions of polysiloxane graft copolymers (SP 1) are known per se and can be prepared in accordance with EP-A 407 799 or 421 588. Two examples of components SP 1 according to the invention are given to illustrate the invention.

They are preferably linear polysiloxanes having mercapto groups as substituents in the side chain, which function as grafting-active groups. This polysiloxane is grafted with vinyl monomers in the presence of polymerization initiators in aqueous emulsion in a manner known per se. Suitable vinyl monomers are styrene, α-methylstyrene, acrylonitrile, methacrylonitrile, (meth)acrylic acid esters, such as methyl methacrylate, hydroxypropyl methacrylate and dimethylaminoethyl methacrylate, methacrylic acid, acrylic acid etc. The reaction conditions are known per se and can be found in the abovementioned specifications.

Preferred polysiloxane graft products (SP 1) are products of a) 40 to 70% by weight, preferably 50 to 65% by weight, of a polysiloxane, as the graft substrate, terminated by hydroxyl groups and containing v mol % of recurring units of the formula

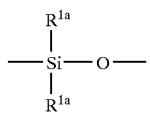

and w mol % of recurring units of the formula

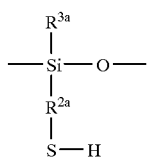

wherein $R^{1a}$ represents alkyl radicals having 1 to 24 C atoms or aryl radicals having 6 to 10 C atoms, $R^{2a}$ represents unbranched or branched alkylene radicals having 1 to 8 C atoms and $R^{3a}$ represents alkyl radicals having 1 to 24 C atoms, aryl radicals having 6 to 10 C atoms, alkoxy radicals having 1 to 6 C atoms or a hydroxyl group or $R^{2a}$ and $R^{3a}$, together with the Si atom, can form a trivalent 5- or 6-membered ring with an unbranched or branched alkylene radical having 4 to 8 C atoms and v is 80 to 99 mol %, preferably 90 to 97 mol %, w is 1 to 20 mol %, preferably 3 to 10 mol %, where v+w gives 100 mol %, and the viscosity, measured at 25° C., of the OH-terminated polysiloxane is between 100 and 100,000 mPa.s, and b) 30 to 60% by weight, preferably 35 to 50% by weight, of graft monomers from the series consisting of styrene and/or α-methylstyrene, (meth)acrylic acid esters, (meth)acrylonitrile and mixtures of these monomers, this series optionally additionally consisting of one or more vinyl monomers of the formulae

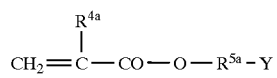

or

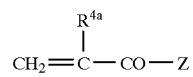

wherein $R^{4a}$ represents an H atom or a methyl group, $R^{5a}$ represents an unbranched or branched alkylene group having 1 to 18 C atoms, Y represents an H atom or the groups —OH or $C_1$–$C_4$-alkoxy and Z represents a group —OH or —$NR_2^{4a}$.

Suitable water-dilutable synthetic polymers (SP 2) are copolymers of olefinically unsaturated compounds having a) a content of incorporated COOH groups, neutralized to the extent of 10 to 100%, of, in total, 60 to 250 milliequivalents per 100 g of solid and b) a content of chemically incorporated radicals, forming part of an ester group, of the formula —OR of 15 to 20% by weight, wherein R represents a mono- or polyolefinically unsaturated aliphatic hydrocarbon radical having 12 to 22 C atoms.

The polymers SP 2 are "water-dilutable" in the context of the invention if they have the content of partly or completely neutralized carboxyl groups mentioned above under a).

Such products are obtainable, for example, according to EP 350 684.

They are copolymers which are obtainable by a) polymerization of olefinically unsaturated dicarboxylic acid anhydrides with other unsaturated monomers, structural units of the formula

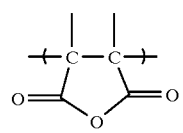

being formed, b) subsequent partial reaction with a monohydric alcohol R—OH (2 to 50%) and c) reaction of the COOH groups obtained in b) with an epoxide compound to the extent of 10–95% and neutralization of the remaining COOH groups with a base.

The water-dilutable synthetic polymers (SP 2) can preferably be prepared by a procedure in which a) a copolymer containing intramolecular carboxylic acid anhydride groups of the formula

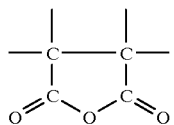

and having a molecular weight $\overline{M}w$ of 5000 to 80,000 and an anhydride equivalent weight of 240 to 1960 is prepared by copolymerization, initiated by free radicals, of olefinically unsaturated dicarboxylic acid anhydrides with other olefinically unsaturated monomers, b) at least 50% of the acid anhydride groups present in the copolymer are then reacted with monohydric alcohols of the formula

R—OH having a molecular weight above 183 with ring-opening ester formation, if appropriate an analogous reaction of up to 50% of the anhydride groups with monohydric saturated alcohols having a molecular weight below 184 being carried out before, at the same time or thereafter, and c) the carboxyl groups present in the reaction product according to stage b) are converted, if appropriate after reaction of some of the carboxyl groups with organic epoxide compounds to the extent of 10 to 95% (of the carboxyl groups still present), into carboxylate groups by neutralization with a base.

The copolymers prepared in stage a) have a molecular weight $\overline{M}w$, which can be determined by the method of gel permeation chromatography, of 5,000 to 80,000, preferably 10,000 to 50,000 and an anhydride equivalent weight of 240 to 1960, preferably 220 to 980. "Anhydride equivalent weight" is to be understood here as the weight in g which corresponds to one mole of copolymerized intramolecular acid anhydride groups.

The copolymers in stage a) are prepared by copolymerization of olefinically unsaturated intramolecular dicarboxylic acid anhydrides with any other desired olefinically unsaturated copolymerizable monomers.

A monomer mixture comprising i) 5 to 40 parts by weight of copolymerizable dicarboxylic acid anhydrides, such as, for example, itaconic anhydride or maleic anhydride, preferably maleic anhydride, ii) 45 to 95 parts by weight of monomers chosen from the group consisting of vinyl aromatics, isopropenyl aromatics, vinyl esters, vinyl ethers, methacrylic acid esters having 1 to 6 carbon atoms in the alcohol radical and any desired mixtures of such monomers and iii) 0 to 50 parts by weight of monomers chosen from the group consisting of acrylic acid esters having 1 to 18 carbon atoms in the alcohol radical, methacrylic acid esters having 7 to 18 carbon atoms in the alcohol radical and any desired mixtures of such monomers is preferably employed in this copolymerization.

Suitable monomers from group ii) are, for example, styrene, α-methylstyrene, vinyl-toluene, styrenes which are $C_1$–$C_4$-alkyl-substituted on the aromatic ring, vinyl acetate, vinyl propionate, vinyl butyrate, ethyl vinyl ether, butyl vinyl ether, methyl methacrylate, ethyl methacrylate, n-butyl methacrylate, iso-butyl methacrylate, n-hexyl methacrylate or cyclohexyl methacrylate.

Suitable monomers from group iii) are, for example, ethyl acrylate, n-butyl acrylate, iso-butyl acrylate, n-propyl acrylate, n-pentyl acrylate, iso-propyl acrylate, hexyl acrylate, 2-ethylhexyl acrylate, n-octyl acrylate, lauryl acrylate-, 2-phenylethyl acrylate, benzyl acrylate, stearyl acrylate, cyclohexyl acrylate, n-octyl methacylate, 2-ethylhexyl methacrylate, lauryl methacrylate, capric methacrylate or stearyl methacrylate.

Monomer mixtures of the following composition are preferably employed for preparation of the copolymers in carrying out stage a) of the process, the following percentage data adding up to 100:

i) 10 to 30% by weight of maleic anhydride, ii) 65 to 90% by weight of styrene, vinyltoluene, methyl methacrylate, n-butyl methacrylate, iso-butyl methacrylate, n-hexyl methacrylate or cyclohexyl methacrylate and iii) 0 to 25% by weight of n-butyl acrylate, 2-ethylhexyl acrylate, lauryl acrylate, stearyl acrylate, 2-phenylethyl acrylate, 2-ethylhexyl methacrylate, stearyl methacrylate, lauryl methacrylate or capric methacrylate.

The copolymerization is in general carried out at a temperature from 60 to 160° C., and preferably in at least 75% strength by weight solution, the solvent and, if appropriate, some of the monomer mixture usually being initially introduced and being heated to the desired reaction temperature. The remaining monomer mixture and the initiator are metered in continuously in the course of 3 to 6 hours. When the polymerization has ended, at least some of the solvent is distilled off, if appropriate.

The copolymers thus prepared, which contain intramolecular anhydride groups, are then reacted with monoalcohols in stage b), at least 50%, preferably at least 85%, of the anhydride groups being converted into half-esters by ring-opening esterification and, if appropriate, up to 50%, preferably up to 15%, of the anhydride groups being converted into half-esters by reaction with low molecular weight saturated monohydric alcohols before, at the same time as and/or after this modification reaction.

The monoalcohols are preferably mono- or polyolefinically unsaturated monohydric alcohols having a molecular weight above 183, of the formula

R—OH wherein

R has the meaning already mentioned above, and preferably represents mono- or polyolefinically unsaturated aliphatic hydrocarbon radicals having 14 to 18 carbon atoms.

Suitable such alcohols are, for example, lauroleyl alcohol, oleyl alcohol, linoleyl alcohol, linolenyl alcohol, elaidyl alcohol, gadoleyl alcohol, arachidonyl alcohol, erucyl alcohol, elupanodonyl alcohol and mixtures of these alcohols.

Preferred alcohols are the fatty alcohol mixtures obtained by transesterification and hydrogenation from naturally occurring oils, such as, for example, soya oil or linseed oil.

The formation of the half-ester is usually carried out after the preparation of the copolymers by a procedure in which the alcohol or the alcohol mixture is metered into the copolymer, which, if appropriate, has been freed completely or partly from any solvents present, and the reaction mixture is kept at 100 to 160° C. for 2 to 10 hours, or until the total acid number is constant.

The alcohols mentioned are employed in stage b) of the process in amounts such that at least 50%, preferably at least 85%, of the acid anhydride groups present in the copolymers of stage a) are converted into half-ester groups by ring-opening ester formation, i.e. the molar ratio of anhydride groups to hydroxyl groups of the alcohols in carrying out stage b) is in general 1:0.5 to 1:1, preferably 1:0.85 to 1:1. After stage b) of the process has been carried out, in general between 15 and 50% by weight, preferably between 20 and 40% by weight, of incorporated structural units of the formula

—O—R are present in the copolymers thus modified.

To guarantee water-dilutability of the oxidatively drying binders thus obtained, the carboxyl groups present are at least partly converted into carboxylate groups by neutralization with a suitable base.

Aqueous inorganic bases, such as, for example, sodium hydroxide, potassium hydroxide or ammonia, can be used for the neutralization. Organic amines, such as, for example, trimethylamine, triethylamine, diethanolamine, methyldiethanolamine, dimethylethanolamine, dimethylethanolamine, triethanolamine or 2-amino-2-methyl-1-propanol, and mixtures of these and other neutralizing agents, are likewise suitable.

In carrying out the neutralization reaction, up to 100%, preferably 20 to 80%, of the carboxyl groups present are converted into carboxylate groups by neutralization.

The products according to Example 1 to 5 of EP-B 350 684 are particularly preferred.

The reaction conditions are known per se and can be found in the abovementioned patent specification.

The polymers (SP 3) containing cationic hydroxyl groups comprise polymers, polycondensates and polyaddition compounds, preferably from the groups consisting of A) vinyl polymers (called VPol below) which are preferably obtained by emulsifying monomer mixtures of
  a) at least 5% by weight of styrene and/or α-methylstyrene, methacrylonitrile, acrylonitrile or mixtures of these monomers,
  b) at least 5% by weight of (meth)acrylic acid esters of monofunctional alcohols having 1 to 12 C atoms
  c) 0.1 to 35% by weight of one or more vinyl monomers of the formulae $$CH_2 = \overset{R^{1a}}{\underset{|}{C}} - CO - O - R^{2a} - Y$$

and/or $$CH_2 = \overset{R^{1a}}{\underset{|}{C}} - CO - Z$$

wherein
$R^{1a}$ represents an H atom or a methyl group,
$R^{2a}$ represents an unbranched or branched alkylene radical having 1 to 18 C atoms,
Y represents an H atom or the group —$OR^{5a}$ and
Z represents a group —OH or —$R^{3a}R^{4a}$, wherein $R^{3a}$, $R^{4a}$ and $R^{5a}$ represent hydrogen or an alkyl radical having 1 to 4 C atoms and the sum of a)+b)+c) is 100% by weight
    (preferably in the presence of a cationic emulsifier), and subjecting the resulting emulsion to free radical polymerization,
B) cationic polycondensates containing hydroxyl groups (called PCond in the following),
and/or
C) cationic polyaddition compounds containing hydroxyl groups (called PAdd in the following).

The cationic polymers (SP 3) containing hydroxyl groups comprise at least one polyaddition compound containing hydroxyl groups and/or a polycondensate and/or a vinyl polymer having a molecular weight $M_n$ above 500, preferably 1,500, and a hydroxyl functionality of at least 2, in general of at least 3. Component SP 3 comprises at least partly, preferably exclusively, those higher molecular weight components which have a content of incorporated ammonium groups which causes solubility or dispersibility of component SP 3 in water. It is in principle possible, but in general not preferred, to use mixtures of those higher molecular weight polyhydroxy compounds SP 3 which are both cationic polyols modified cationically in this manner and polyols which are not ionically modified, provided that the content of cationically modified polyols is sufficiently high to guarantee dispersibility or solubility of the total mixture. The content of chemically incorporated ammonium groups in the higher molecular weight polyol component SP 3 can be 8 to 450, preferably 25 to 250, milliequivalents per 100 g of solid.

The molecular weights $M_n$ are determined by vapour pressure osmometry in dioxane and acetone in the case of molecular weights of up to 5000 and by membrane osmometry in acetone in the case of molecular weights above 5000.

The cationic modification of the higher molecular weight polyhydroxy compounds is in general carried out by incorporation of tertiary nitrogen atoms and subsequent conversion thereof into ammonium groups by neutralization with an acid or by quaternization with a quaternizing agent.

Suitable higher molecular weight polyhydroxy compounds are polyaddition, polycondensation and/or polymerization products which correspond to the definitions given above. These compounds often contain both segments which are formed by a polyaddition reaction and those which are formed by a polycondensation reaction, or also those which are formed by a polymerization reaction.

Examples of compounds which can be used as component SP 3 or part of component SP 3 or can be converted into such compounds by simple neutralization or quaternization are:
  (i) polyether-polyols with incorporated tertiary nitrogen atoms which can be prepared by propoxylation and/or ethoxylation of starter molecules containing amine nitrogen. Such polyether-polyols are, for example, the propoxylation and/or ethoxylation products of ammonia, ethanolamine, triethanolamine or ethylenediamine or of mixtures of such amines.

(ii) Polyesters or polyamides which contain tertiary nitrogen atoms and correspond to the statements made above, obtainable by polycondensation of polyfunctional starting compounds, if appropriate co-using monofunctional starting compounds, by known processes by polycondensation of alcohols or amines and carboxylic acids, such as are defined in Römpp's Chemielexikon, Volume 1, page 202, Frankh'sche Verlagsbuchhandlung, Stuttgart, 1966, or described by D. H. Solomon, The Chemistry of Organic Filmformers, pages 75–101, John Wiley & Sons Inc., New York, 1967.

In the case where polyamines having more than two primary/secondary amino groups for condensation with the carboxylic acids are used for preparation of the polyamides, it is preferable to convert the primary/secondary amino groups remaining in the polyamide into tertiary amino groups. Alkylation with ethylene oxide and/or propylene oxide or addition of the amino group onto the double bond of acrylic acid derivatives, such as acrylonitrile or acrylic acid alkyl esters having 1 to 18 C atoms, is particularly suitable for this.

Starting materials for preparation of the polycondensates are, for example:

1- to 6-, preferably 2- to 4-hydric alcohols of the molecular weight range from 32 to 500, preferably 62 to 250, such as ethylene glycol, propylene glycol, butanediols, neopentylglycol, cyclohexane-dimethanols, 2-ethylpropane-1,3-diol, hexanediols, ether alcohols, such as di- and triethylene glycols, oxyethylated bisphenols, perhydrogenated bisphenols, trimethylolpropane, trimethylolethane, glycerol, pentaerythritol, dipentaerythritol, mannitol, sorbitol, monohydric chain-terminating alcohols, such as methanol, ethanol, propanol, butanol, ethylhexanol and benzyl alcohol, and gluconic acid lactone.

Monofunctional or polyfunctional aliphatic or aromatic carboxylic acids or carboxylic acid anhydrides, esters or amides, such as phthalic acid, isophthalic acid, terephthalic acid, pyromellitic anhydride, trimellitic anhydride, maleic anhydride, succinic anhydride, adipic acid, oxalic acid, dimethyl succinate, glutaric acid, benzoic acid, tetrahydrophthalic acid, hexahydrobenzoic acid, coconut fatty acid, caprolactam or lauryllactam.

Olefinically unsaturated fatty acids and derivatives, such as the fatty acid of linseed oil, soya oil, wood oil, safflower oil, dehydrated castor oil, cottonseed oil, groundnut oil or tall oil, or synthetic unsaturated $C_{12}$–$C_{22}$-fatty acids, as well as derivatives obtained by conjugation, isomerization or dimerization/trimerization of such unsaturated fatty acids.

The oils corresponding to the naturally occurring fatty acids mentioned last, i.e. linseed oil, soya oil, wood oil, safflower oil, dehydrated castor oil, cottonseed oil, groundnut oil, tall oil or also castor oil.

Amines and/or alcohols containing tertiary nitrogen atoms, such as N-methyl-diethanolamine, N-methyl-dipropanolamine, N-butyldiethanolamine, N-stearyl-diethanolamine, triethanolamine, tripropanolamine, hydroxyethylmorpholine, 2-hydroxypropylmorpholine, hydroxyethylpiperazine, 2-hydroxypropylpiperazine and simple alkoxylation products thereof having a molecular weight $M_n$ below 3000.

Polyamines with or without tertiary amino groups, such as ethylenediamine, diethylenetriamine, triethylenetetramine, bis-3-aninopropyl-methylamine, aminoethylpiperazine and the higher branched and unbranched homologous polyethylenepolyamines, aminoethanol or hexamethylenediamine.

(iii) Polyols which contain urethane groups and tertiary nitrogen atoms and correspond to the above definitions, and which are prepared in a manner known per se from the customary starting materials of polyurethane chemistry.

To prepare such polyurethanes, for example, the low molecular weight starting components mentioned last, which are preferably at least difunctional, and have tertiary nitrogen atoms and groups which are reactive towards isocyanates; polyester-polyols with or without incorporated tertiary nitrogen atoms having a molecular weight $M_n$ above 250 and up to 10,000, preferably of 1000 to 5000; polyether-polyols having the same molecular weight range with or without incorporated tertiary nitrogen atoms; simple polyhydric alcohols of the molecular weight range $M_n$ from 62 to 250 of the type already mentioned above as examples, or any desired mixtures of such polyhydroxy compounds, can be reacted with organic polyisocyanates using an excess of isocyanate, the nature and ratios of the amounts of the reaction partners being chosen so as to give urethane-modified polyhydroxy compounds which correspond to the abovementioned conditions in respect of the content of tertiary nitrogen atoms, molecular weight and hydroxyl functionality.

Polyisocyanates, such as hexamethylene diisocyanate, isophorone diisocyanate, 4,4'-dicyclohexylmethane diisocyanate, 2,4- and/or 2,5-diisocyanatotoluene, dimeryldiisocyanate, bis-isocyanatohexyl-oxadiazinetrione and/or the homologous polyisocyanates or polyisocyanate mixtures are suitable for the preparation of such resins.

(iv) Vinyl polymers containing hydroxyl groups corresponding to the statements made above, obtainable by copolymerization, which is known per se, of olefinically unsaturated monomers co-using monomers which contain hydroxyl groups and monomers which contain tertiary nitrogen atoms. Monomers which are suitable for the preparation of such vinyl polymers are, for example, $C_1$–$C_8$-, preferably $C_1$–$C_4$-alkyl methacrylates, in particular methyl methacrylate or ethyl methacrylate or n-butyl methacrylate; styrene; $C_1$–$C_8$-alkyl acrylates, such as methyl, ethyl, isopropyl, n-butyl, n-hexyl or 2-ethylhexyl acrylate; $C_2$–$C_8$-hydroxyalkyl (meth)acrylates, preferably hydroxyethyl methacrylate, 2-hydroxypropyl methacrylate, 4-hydroxybutyl methacrylate or any desired mixtures of such monomers; vinyltoluenes; vinyl esters, such as vinyl acetate; and monomers containing tertiary nitrogen atoms, such as dimethylaminoethyl methacrylate, (meth)acrylic acid esters of 2-hydroxyethylmorpholine or -piperidine or N,N-dimethylaminoethanol; (meth)acrylonitrile; (meth)acrylamide; diallyldialkyl-ammonium chloride (alkyl preferably $C_1$–$C_4$-alkyl); methylacrylamidoglycolic acid methyl ester (MAGME); trimethylammonium-ethyl methacrylamide or its ester as the chloride salt; monomers containing tertiary nitrogen atoms, such as, for example, (meth)acrylic acid amides of diamines containing tertiary nitrogen, such as N,N-dimethyl-propylenediamine.

The preparation of vinyl polymers containing tertiary nitrogen atoms by reaction of nitrogen-free starting materials with incorporation of alcohols containing tertiary nitrogen atoms, of the type mentioned above as examples, via urethane bonds, i.e. by reaction of some of the hydroxyl groups of the vinyl polymers with isocyanates or isocyanatourethanes which contain tertiary nitrogen and have been prepared beforehand, for example, by reaction of monohydric alcohols containing tertiary nitrogen atoms, of the type mentioned as examples, with a high excess of diisocyanate with subsequent removal of the unreacted diisocyanate by distillation, is also possible in principle. It is also possible to obtain polymers containing tertiary amino groups by polymer-analogous reaction of polyacrylonitrile copolymers with amines which contain a tertiary amino group and a primary amino group.

Particularly preferred components SP 3 are the vinyl polymer polyols (VPol) mentioned last. Polyamide-amine condensates (PCond) of the starting components from the group consisting of adipic acid, caprolactam, methyl acrylate, ethylenediamine, aminoethanol, diethylenetriamine, aminoethylpiperazine, dimeric fatty acid, stearic acid, palm oil fatty acid, coconut fatty acid, triethylenetetramine and reaction products thereof with ethylene oxide and/or propylene oxide, acrylonitrile, methyl acrylate and gluconic acid lactone are also preferred.

Component SP 3 can comprise any desired mixtures of the higher molecular weight polyhydroxy compounds mentioned as examples, provided that these correspond to the statements made above in respect of the content of ammonium groups. The tertiary nitrogen atoms are converted into ammonium ions by neutralization or quaternization.

Acids which are suitable for neutralization of the tertiary nitrogen atoms are, in particular, aliphatic acids, such as acetic acid, formic acid, tartaric acid, methane-sulphonic acid, malic acid, lactic acid, malonic acid, adipic acid, succinic acid or fumaric acid. The neutralization can be carried out in bulk, in water or in an organic phase.

To prepare an aqueous dispersion of component SP 3, it is often sufficient to mix the polyhydroxy compound containing tertiary nitrogen atoms with an aqueous solution of an acid suitable for the neutralization. If anhydrous components SP 3 which are soluble or dispersible in water are to be prepared, neutralization with an anhydrous acid, such as, for example, methanesulphonic acid, is advisable, so that an anhydrous salt which can be dissolved or dispersed at any desired point in time by simply stirring with water is formed. The co-use of water-miscible solvents, such as acetone, during the neutralization is also conceivable. Acetone solutions of the at least partly neutralized polyhydroxy compounds can be stirred with water in a particularly simple manner, after which removal of the acetone by distillation follows.

Suitable alkylating agents are, for example, methyl chloride, methyl bromide, methyl iodide, ethyl iodide, dimethyl sulphate, ethyl sulphate, p-toluenesulphonic acid ethyl ester, ethylene oxide and propylene oxide. The alkylation can be carried out, for example, co-using solvents, such as acetone, dioxane, acetonitrile, ethyl acetate or tert-butanol, at 20 to 100° C., if appropriate under pressure, with subsequent removal of the solvent. The alkylation can also advantageously be carried out in the presence of small amounts of polar, high-boiling solvents, which are then not removed and, where appropriate, act as coalescing agents, such as, for example, N-methylpyrrolidone and the acetates of propylene glycol and glycerol.

Preferred embodiments of the invention embrace compositions comprising the following formulations:

A: 1. 10 to 90 parts by weight of polyisocyanate (PI),
2. 0 to 450 parts by weight of naturally occurring polymer (NP) and
3. 10 to 90 parts by weight of polysiloxane graft copolymer (SP 1) or cationic polymer (SP 3) containing hydroxyl groups;

B: 1. 10 to 90 parts by weight of polyisocyanate (PI),
2. 0 to 450 parts by weight of naturally occurring polymer (NP) and
3. 0 to 90 parts by weight of water-dilutable synthetic polymer (SP 2)

with the proviso that component B2) makes up at least 50 parts by weight if no component B3) is present, and that component B3) makes up at least 10 parts by weight if component B2 is not present.

In principle, it is to be noted that mixtures of the various synthetic polymers SP 1, SP 2 and SP 3 can also be employed according to the invention.

The present invention also relates to a process for finishing paper, i.e. for the production of cellulose-containing material which has been given dry strength and/or wet strength treatment and/or sized, characterized in that cellulose-containing material is treated in the pulp and/or on the surface with one of the compositions described, it being possible for the individual components to be metered in independently of one another.

Cellulose-containing material in the context of the present invention is paper fibrous materials based on chemical pulp, mechanical wood pulp, semichemical pulp, recycled paper, cotton linters, hemp, jute, flax and other naturally occurring fibrous materials. Mixtures of the abovementioned fibrous materials with synthetic fibres can also be employed according to the invention. The fibre slurry employed for production of paper, pasteboard and card optionally comprises customary fillers, such as kaolin, china clay, chalk, titanium dioxide and the like, and auxiliaries, such as retention agents, defoamers, biocides and the like.

Use

For carrying out the process according to the invention, the polyisocyanates (1) are preferably employed without organic solvents. They are very easy to emulsify in water, if appropriate with the addition of acids and/or at temperatures of up to 100C. The active compound content of the emulsion can be up to 70% by weight. However, it is more advantageous to prepare emulsions having an active compound content of 1 to 30% by weight, which can then be diluted further, if appropriate, before the metering point. The mixing units customary in the art (stirrers, mixers with the rotor-stator principle and, for example, high-pressure emulsifying machines) are suitable for the emulsification. The preferred polyisocyanates are self-emulsifying, i.e. after addition to the water phase, they can easily be emulsified even without the action of high shearing forces. As a rule, a static mixer is sufficient. The resulting emulsions have a certain processing time which depends on the structure of the polyisocyanates employed, in particular on their content of basic N atoms. The processing time of such an aqueous emulsion at room temperature is as a rule up to about 24 hours. The processing time is defined as the time within which the optimum dry- and wet-strength action or sizing action is achieved. Cationic polyisocyanate emulsions have a processing time of about 7 hours.

To facilitate incorporation into the aqueous phase, it may be expedient to employ the polyisocyanate to be employed according to the invention as a solution in a solvent which is inert towards isocyanate groups. Examples of suitable solvents are ethyl acetate, ethylene glycol diacetate, propylene glycol diacetate, 2-butanone, 1-methoxyprop-2-yl acetate, toluene or mixtures thereof. The content of solvents in the solution of the polyisocyanate should be not more than 80% by weight, preferably not more than 50% by weight. However, the use of solvent-free polyisocyanates is particularly preferred. Polyisocyanates I having a viscosity of <5000 mPa.s, preferably <2500, particularly <1600 mPa.s, in each case measured at 25° C. are particularly preferred here.

The cellulose-containing materials which are suitable for the process according to the invention comprise, for example, paper or paper-like materials, such as pasteboard or card. The treatment is carried out in a manner known per se.

For carrying out the process according to the invention, the compositions or dispersions according to the invention are employed, for example, in the pulp. Suitable raw materials for production of the papers treated according to the invention in pulp are bleached and non-bleached chemical pulps, tissue pulps, mechanical wood pulp and recycled and deinked pulps, which can additionally comprise fillers or customary additives. A procedure can be followed here in which the polyisocyanate is emulsified in water at a temperature of 10 to 80° C., the emulsion is mixed with the other components and the emulsion thereby obtained is added to a suspension of the fibrous raw material or dispersed directly in the suspension of the fibrous materials, and the paper is formed from this suspension by dewatering and is then dried. For emulsification of the polyisocyanate, it is expedient initially to introduce an appropriate amount of water into the vessel. The dispersing operation is preferably carried out continuously in metering and dispersing units.

For use on the surface, a finished base paper is treated with an aqueous dispersion according to the invention and then dried. Customary base papers from the abovementioned chemical pulp systems which have been produced under acid or neutral conditions are suitable for treatment on the surface, for example for the production of hygiene papers, laminated papers, coated base papers, printing paper, label papers, carbonless copying papers and packaging papers and cardboards.

The papers can comprise customary fillers, such as clay, chalk, titanium dioxide, dyestuffs, pigments, brighteners and customary paper auxiliaries, such as sizing agents, wet strength agents, retention agents and fixing agents. Use in the sizing press or film press or via blades is possible. In this procedure, the polyisocyanate, which has been emulsified in water as already described, is applied to the finished paper web together with the other components. Spray application is also possible. The effect according to the invention is already achieved immediately after drying. The wet-strength effect which can be achieved by surface treatment considerably exceeds the level which can be achieved with the wet-strength agents known to date with the same dosage of active substance. The sizing action can be controlled by the ratio of the components.

It is a great advantage of the dispersions according to the invention that the increase in wet strength, dry strength, tear propagation resistance and sizing action can be adjusted very readily within wide ranges, also independently of one another, by the amounts of the components employed. Examples for particularly suitable dispersions are described in detail below.

The dispersions according to the invention are in general prepared as follows:

Polyisocyanate I+Polysiloxane Graft Copolymer (SP 1)+Optionally Naturally Occurring Polymer (NP)

Polyisocyanate I is emulsified in water as described above. The emulsion is diluted to a concentration of 0.1 to 10% by weight. A dispersion of the polysiloxane graft copolymer in water is correspondingly diluted to 0.1 to 10% by weight. The two dispersions are then mixed and then employed for treatment of the cellulose-containing substrate in the pulp and/or on the surface. However, they can also be employed independently of one another in the pulp and/or on the surface. Joint metering of the previously obtained mixture is in general preferred.

However, it is also possible to employ the dispersion of polyisocyanate I in the pulp and the dispersion of the polysiloxane graft copolymer on the surface or vice versa.

If a naturally occurring polymer (NP) is additionally used, it is advantageous to disperse the dispersion of polyisocyanate I (PI) and of the synthetic polymer (SP 1) in the prepared starch solution. However, independent metering of the individual components can also be carried out in this case.

The amounts of the dispersions according to the invention employed can be, in each case stated as the active substance, based on the cellulose-containing material, 0.005–10% by weight of polyisocyanate I (PI),
0.005–10% by weight of polysiloxane graft copolymer (SP 1)
and optionally
0.005–10% by weight of naturally occurring polymer (NP).

The use, based on the cellulose-containing material, of
0.05–5% by weight of polyisocyanate I (P1),
0.05–5% by weight of polysiloxane graft copolymer (SP 1) and optionally
0.5–7% by weight of naturally occurring polymer (NP) is particularly preferred.

The weight ratio of the active compounds of polyisocyanate (PI) and polysiloxane graft copolymer (SP 1) should preferably be in the range from PI:SP 1=1:20 to 20:1, particularly preferably between 5:1 to 1:5.

For the effect according to the invention in the treatment of paper, pasteboard or cardboard, it is generally sufficient to employ an amount of not more than 2% by weight of polyisocyanate I active substance and not more than 1% by weight of polysiloxane graft copolymer SP 1 active substance; Starch is usually employed here in an amount of up to 5% by weight of active substance.

The term "active substance" or "active compound" relates to the content of constituents PI, SP or NP in the particular component of the dispersion or of the overall dispersion and as a rule corresponds to the solids content resulting as the residue after evaporation of the water.

The finished papers furthermore can also comprise customary fillers, such as chalk, kaolin, titanium dioxide, iron pigments, bentonite etc. The filler content can be up to 40%, based on the fibrous material.

Outstanding sizing effects are achieved with the compositions or dispersions according to the invention. The sizing action reaches its maximum when the ratio of the active compounds, based on the cellulose-containing material, is about 1 part by weight of polyisocyanate mixture 1 to 0.5 part by weight of polysiloxane graft copolymer (SP 1).

To achieve the desired effect in the pulp, it is particularly preferable to meter the aqueous emulsion of the polyisocyanates to be employed according to the invention into the fibrous material in the course of 60 minutes, preferably in the course of 15 minutes. Continuous dispersion and metering of the polyisocyanates are particularly preferred. To achieve the optimum wet-strength effect or sizing effect under conditions in practice, metering of the polyisocyanate into the pulp, for example shortly before the headbox of the paper machine, or partial metering into the pulp control unit is particularly advisable. Use in the sizing press presents no difficulties, since no foaming problems occur. For testing, sheets of paper having a weight per unit area of 20 to 100 g/m$^2$ will in general be formed in the laboratory. Higher weights per unit area (card) can also be established without problems.

In water, the NCO groups of the polyisocyanates to be employed according to the invention hydrolyse slowly with evolution of $CO_2$ to give the corresponding amines, which partly react with NCO groups still present to form urea groups. It is advantageous that the partly or completely hydrolysed polyisocyanate dispersions are also stable dispersions, since they result in no precipitation.

In the process according to the invention, the products can be metered into the fibrous material in the pulp in the pH range between 4 and 10, preferably between 5.5 and 9.

Use in the pH range from 6 to 7.5 is particularly preferred.

In this pH range, some of the tertiary amino groups are present in protonated form. It is also possible to carry out the dispersing operation with the addition of acid. A cationic charge which is independent of the pH is obtained if the polyisocyanates obtained by quaternization of the tertiary amino groups are employed. However, quaternization is not necessary for most uses.

The compositions or dispersions according to the invention result in ready-to-use papers of good strength and sizing immediately from the machine. Strengthening can be achieved by storage of the finished paper and/or aftercondensation. Generally, however, a higher level can already be achieved from the machine than with conventional wet-strength agents or sizing agents. The dry strength is also in some cases improved compared with conventional dry-strength agents. The effect according to the invention occurs if certain ratios of amounts of polyisocyanate I and/or polysiloxane graft copolymer (SP 1) and naturally occurring polymer (NP) are observed. A positive influence on the whiteness without and with optical brighteners (intensification of the whiteness) is advantageously also found.

The process according to the invention is carried out under the processing temperatures customary in the paper industry. The processing time here depends on the temperature. In the temperature range from 20 to 25° C., the processing time is relatively long. After storage of the aqueous emulsion for 6 hours, for example, the action still achieves about 70% of the value achieved with immediate use of the emulsion. At a higher temperature, for example at 50° C., processing within 2 hours is recommended. Dispersion and metering in known dispersing/metering apparatuses is particularly advantageous, since short residence times within the region of minutes can be achieved here.

The compositions or dispersions according to the invention can be employed in combination with other auxiliaries, such as retention agents, fixing auxiliaries, sizing agents, dry-strength agents, binders, brighteners and wet-strength agents. Fixing of fillers can be intensified further, in particular, by addition of commercially available retention agents of the type of cationic polycondensates and polymers, for example polyamines, polyethyleneimines, polyamide-amines and polyacrylamides, and of dual systems comprising cationic or cationic and anionic ad optionally particulate components, such as silica sols etc. This is of particular interest if use in the laminated paper sector is intended. Preferred retention agents in the context of the invention are cationic polycondensates of polyamines, preferably N-methyl-bis(3-aminopropyl)amine, and alkylene dihalides, preferably dichloroethane. It is to be emphasized, however, that the desired effect can also be achieved without the addition of particular fixing agents.

The compositions or dispersions according to the invention are readily compatible with customary optical brighteners. They do not lead to a reduction in whiteness, as, for example, conventional wet-strength agents based on epichlorohydrin do. Furthermore, a soft handle of the paper can be achieved for use in the hygiene paper sector. When employed by coating, the dispersions according to the invention result in an increase in whiteness of about 1–10%.

The preparation applied improves the use properties of paper, in particular the writing properties, the printability, the strength and the tendency to form dust, and leads to a reduced absorption of water and to a positive influencing of the whiteness. The effects can be measured above all as the $Cobb_{60}$ value, IGT picking test, strength testing and as the ink flotation test and drop test.

Polyisocyanate I+(Naturally Occurring Polymer (NP) and/or Synthetic Polymer (SP 2))

A) Starch+polyisocyanate

The auxiliary composition customary for use can be prepared as follows:

a) Common Formulation

Natural starch is boiled continuously or discontinuously at a concentration of 20–30% by weight and, for example, 130° C. until the desired viscosity is reached, and if appropriate is broken down enzymatically or oxidatively. It is then diluted to a customary usable concentration of 5 to 8% by weight and pumped into the working container (generally known).

Polyisocyanates I are metered into this mixture, 0.01 to 10% by weight, based on the liquor, being metered in. Polyisocyanate I is preferably preemulsified in water (1–20% by weight). A liquor of the following composition is preferably employed:

0.01 to 10 parts by weight of starch (derivative), 0.01 to 10 parts by weight of polyisocyanate I and 98.98 to 80 parts by weight of water.

The homogeneous liquor is added to the material in the pulp in the customary manner, or metered into the sizing press or onto the surface of the paper using application units such as film presses.

b) Individual Metering

Independent, separate metering of the components of the auxiliary according to the invention is of course also possible.

It is also possible here for the components to be metered into the pulp or onto the surface, where the metering points can in each case be independent.

It is preferable to mix the components in a common working container and to meter them into the material in this way.

B) Polyisocyanate PI+Synthetic Polymer SP 2

For use of the synthetic polymer (SP 2) in combination, a dispersion of the polymer is mixed with a preemulsion of polyisocyanate I in water and, for example, the mixture is metered in with the aid of a sizing press for surface treatment or added to the fibrous material suspension in the pulp.

A liquor comprising 0.01 to 10% by weight of polyisocyanate I, 0.01 to 10% by weight of synthetic polymer SP 2 and 98.98 to 80% by weight of water is preferably employed here.

C) Polyisocyanate PI/Synthetic Polymer SP 2/Naturally Occurring Polymer NP

Application is carried out as described above by mixing the individual components to give a liquor which preferably comprises:

0.01 to 10% by weight of polyisocyanate I, 0.01 to 10% by weight of naturally occurring polymer (NP), 0.01 to 10 parts of synthetic polymer (SP 2) and 99.97 to 70 parts of water.

The amount of dispersion according to the invention employed, based on the finished paper, is preferably 0.005 to 10% by weight of polyisocyanate (active compound), 0.005 to 10% by weight of naturally occurring polymer (NP), preferably starch (derivative), and 0.005 to 5% by weight of synthetic polymer (SP 2) (active compound).

The finished papers furthermore can also comprise customary fillers, such as chalk, kaolin, titanium dioxide, iron pigments, bentonite and the like.

The filler content can be up to 40% by weight, based on the fibrous material.

Particularly good results are achieved if the active compounds of starch and polyisocyanate I are employed in a weight ratio of 100:1 to 0.5:1.

The ideal ratio of the active compound of the polyisocyanate to the active compound of the synthetic polymer (SP 2) is likewise 20:1 to 1:20.

If starch is additionally employed, the optimum range results from 1 part by weight of the sum of the active compounds of polyisocyanate I and of synthetic polymer (SP 2) per 1 to 10 parts by weight of starch, it being possible for the ratio between polyisocyanate I and synthetic polymer (SP 2) to be varied between 1:20 and 20:1.

A combination of 1 to 10 parts by weight of starch, 0.4 to 0.6 part by weight of polyisocyanate I and 0.1 to 0.4 part by weight of synthetic polymer (SP 2) is particularly preferred.

Excellent sizing effects are achieved with this mixture. The sizing action reaches its maximum when the ratio is about 1 part by weight of polyisocyanate I/0.5 part by weight of synthetic polymer (SP 2).

To achieve the desired effect in the pulp, it is particularly preferable to meter the aqueous emulsion of the polyisocyanates to be employed according to the invention into the fibrous material in the course of 60 minutes, preferably in the course of 15 minutes. Continuous dispersion and metering of the polyisocyanates are particularly preferred. To achieve the optimum wet-strength effect or sizing effect under conditions in practice, metering of the polyisocyanate into the pulp, for example shortly before the headbox of the paper machine, or partial metering into the pulp control unit is particularly advisable. Use in the sizing press for application to the surface is particularly advantageous, since no foaming problems occur. For testing, sheets of paper having a weight per unit area of 20 to 100 g/m$^2$ will in general be formed in the laboratory. Higher weights per unit area (card) can also be established without problems.

In water, the NCO groups of the polyisocyanates to be employed according to the invention hydrolyse slowly with evolution of $CO_2$ to give the corresponding amines, which partly react with NCO groups still present to form urea groups. It is advantageous that the partly or completely hydrolysed polyisocyanate dispersions are also stable dispersions, since they result in no precipitation.

In the process according to the invention, the products can be metered into the fibrous material in the pulp in the pH range between 4 and 10, preferably between 5.5 and 9. Use in the pH range from 6 to 7.5 is particularly preferred.

In this pH range, some of the tertiary amino groups are present in protonated form. It is also possible to carry out the dispersing operation with the addition of acid. A cationic charge which is independent of the pH is obtained if the polyisocyanates obtained by quaternization of the tertiary amino groups are employed. However, quaternization is not necessary for most uses.

The dispersions to be employed according to the invention result in ready-to-use papers of good strength and sizing immediately from the machine. Strengthening can be achieved by storage of the finished paper and/or aftercondensation. Generally, however, a higher level can already be achieved from the machine than with conventional wet-strength agents or sizing agents. The dry strength is also in some cases improved compared with conventional dry-strength agents. The effect according to the invention occurs if certain ratios of amounts of polyisocyanate I and naturally occurring polymer (NP) and/or synthetic polymer (SP2) are observed. A positive influence on the whiteness without and with optical brighteners (intensification of the whiteness) is also advantageous.

The process according to the invention is carried out under the processing temperatures customary in the paper industry. The processing time here depends on the temperature. In the temperature range from 20 to 25° C., the processing time is relatively long. After storage of the aqueous emulsion for 6 hours, for example, the action still achieves about 70% of the value achieved with immediate use of the emulsion. At a higher temperature, for example at 50° C., processing within 2 hours is recommended. Dispersion and metering in known dispersing/metering apparatuses is particularly advantageous, since short residence times within the region of minutes can be achieved here.

The compositions or dispersions according to the invention can be employed in combination with other auxiliaries, such as retention agents, fixing auxiliaries, sizing agents, dry-strength agents, binders, brighteners and wet-strength agents. Fixing of fillers can be intensified further, in particular, by addition of commercially available retention agents of the type of cationic polycondensates and polymers, for example polyamines, polyethyleneimines, polyamide-amines and polyacrylamides, and of dual systems comprising cationic or cationic and anionic and optionally particulate components, such as silica sols etc. This is of particular interest if use in the laminated paper sector is intended. Preferred retention agents in the context of the invention are cationic polycondensates of polyamines, preferably N-methyl-bis(3-aminopropyl)amine, and alkylenedihalides, preferably dichloroethane. It is to be emphasized, however, that the desired effect can also be achieved without the addition of particular fixing agents.

The dispersions to be employed according to the invention are readily compatible with customary optical brighteners. The products to be employed according to the invention do not lead to a reduction in whiteness, as, for example, conventional wet-strength agents based on epichlorohydrin do. Furthermore, a soft handle of the paper can be achieved for use in the hygiene paper sector. When employed by coating, the dispersions according to the invention result in an increase in whiteness of about 1–10%.

The preparation applied improves the use properties of paper, in particular the writing properties, the printability, the strength and the tendency to form dust, and leads to a reduced absorption of water and to a positive influencing of the whiteness. The effects can be measured above all as the $Cobb_{60}$ value, IGT picking test, strength testing and as the ink flotation test and drop test.

Polyisocyanate+Cationic Polymer (SP 3) Containing Hydroxyl Groups+Optionally Naturally Occurring Polymer (NP)

The dispersions according to the invention are in general prepared as follows: polyisocyanate I is emulsified in water as described above. The emulsion is diluted to a concentration of 0.1 to 10% by weight. A solution or dispersion of the cationic polymer SP 3 containing hydroxyl groups (VinylP, Pcond, PAdd) in water is correspondingly diluted to 0.1 to 10% by weight. The two dispersions are then mixed and employed for treatment of the cellulose-containing substrate in the pulp and/or on the surface. However, they can also be employed independently of one another in the pulp and/or on the surface. Joint metering of the previously obtained mixture is in general preferred. It is furthermore possible to employ mixtures of the various types of polymers SP mentioned in combination.

However, it is also possible to employ the dispersion of polyisocyanate I in the pulp and the polymer component SP on the surface or vice versa.

If a naturally occurring polymer (NP) is additionally used, it is advantageous to disperse the dispersion of polyisocyanate I (PI) and of the synthetic polymer (SP 3) in the prepared starch solution. However, independent metering of the individual components can also be carried out in this case.

The amounts of the dispersions according to the invention employed can be, in each case stated as the active substance, based on the cellulose-containing material, 0.005–10% by weight of polyisocyanate I (PI), 0.005–10% by weight of synthetic polymer (SP 3)

and optionally 0.005–10% by weight of naturally occurring polymer (NP).

The use, based on the cellulose-containing material, of 0.05–5% by weight of polyisocyanate I (PI), 0.05–5% by weight of synthetic polymer (SP 3) and optionally 0.5–7% by weight of naturally occurring polymer (NP)

is particularly preferred.

The weight ratio of the active compounds of polyisocyanate (P1) and synthetic polymer (SP 3) should preferably be in the range from PI:SP 3=1:20 to 20:1, particularly preferably between 5:1 to 1:5.

For the effect according to the invention in the treatment of paper, pasteboard or cardboard, it is generally sufficient to employ an amount of not more than 2% by weight of polyisocyanate active substance and not more than 4% by weight of synthetic polymer SP 3 active substance. Starch is usually employed here in an amount of up to 5% by weight of active substance.

The finished papers furthermore can also comprise customary fillers, such as kaolin, $CaCO_3$, $TiO_2$, iron pigments, bentonite and the like.

The filler content can be up to 40% by weight, based on the fibrous material.

Good sizing effects are achieved with the compositions or dispersions according to the invention if the ratio of the active compounds, based on the cellulose-containing material, is about 1 part by weight of polyisocyanate I to 1 to 10 parts by weight of synthetic polymer (SP 3). The wet-strength action is already improved if small amounts of the cationic synthetic polymer SP 3 containing hydroxyl groups, preferably from the group consisting of the vinyl polymers (VPol) mentioned and/or of the polycondensates mentioned, are added to the dispersion of the polyisocyanate. In the later case, the amounts employed preferably range from 0.1 to 5% by weight of active substance of component SP 3.

To achieve the desired effect in the pulp, it is particularly preferable to meter the aqueous emulsion of the polyisocyanates to be employed according to the invention into the fibrous material in the course of 60 minutes, preferably in the course of 15 minutes. Continuous dispersion and metering of the polyisocyanates are particularly preferred. To achieve the optimum wet-strength effect or sizing effect under conditions in practice, metering of the polyisocyanate into the pulp, for example shortly before the headbox of the paper machine, or partial metering into the pulp control unit is particularly advisable. Use in the sizing press presents no difficulties, since no foaming problems occur. For testing, sheets of paper having a weight per unit area of 20 to 100 g/m$^2$ will in general be formed in the laboratory. Higher weights per unit area (card) can also be established without problems.

In water, the NCO groups of the polyisocyanates to be employed according to the invention hydrolyse slowly with evolution of $CO_2$ to give the corresponding amines, which partly react with NCO groups still present to form urea groups. It is advantageous that the partly or completely hydrolysed polyisocyanate dispersions are also stable dispersions, since they result in no precipitation.

In the process according to the invention, the products can be metered into the fibrous material in the pulp in the pH range between 4 and 10, preferably between 5.5 and 9. Use in the pH range from 6 to 7.5 is particularly preferred.

In this pH range, some of the tertiary amino groups are present in protonated form. It is also possible to carry out the dispersing operation with the addition of acid. A cationic charge which is independent of the pH is obtained if the polyisocyanates obtained by quaternization of the tertiary amino groups are employed. However, quaternization is not necessary for most uses.

The compositions or dispersions according to the invention result in ready-to-use papers of good strength and sizing immediately from the machine. Strengthening can be achieved by storage of the finished paper and/or aftercondensation. Generally, however, a higher level can already be achieved from the machine than with conventional wet-strength agents or sizing agents. The dry strength is also in some cases improved compared with conventional dry-strength agents. The effect according to the invention occurs if certain ratios of amounts of polyisocyanate I to synthetic polymer (SP 3) and naturally occurring polymer (NP) are observed. A positive influence on the whiteness without and with optical brighteners (intensification of the whiteness) is advantageously also found.

The process according to the invention is carried out under the processing temperatures customary in the paper industry. The processing time here depends on the temperature. In the temperature range from 20 to 25° C., the processing time is relatively long. After storage of the aqueous emulsion for 6 hours, for example, the action still achieves about 70% of the value achieved with immediate use of the emulsion. At a higher temperature, for example at 50° C., processing within 2 hours is recommended. Dispersion and metering in known dispersing/metering apparatuses is particularly advantageous, since short residence times within the region of minutes can be achieved here.

The compositions or dispersions according to the invention can be employed in combination with other auxiliaries, such as retention agents, fixing auxiliaries, sizing agents, dry-strength agents, binders, brighteners and wet-strength agents. Fixing of fillers can be intensified further, in particular, by addition of commercially available retention agents of the type of cationic polycondensates and polymers, for example polyamines, polyethyleneimines, polyamide-amines and polyacrylamides, and of dual systems comprising cationic or cationic and anionic and optionally particulate components, such as silica sols etc. This is of particular interest if use in the laminated paper sector is intended. Preferred retention agents in the context of the invention are cationic polycondensates of polyamines, preferably N-methyl-bis(3-aminopropyl)amine, and alkylenedihalides, preferably dichloroethane. It is to be emphasized, however, that the desired effect can also be achieved without the addition of particular fixing agents.

The compositions or dispersions according to the invention are readily compatible with customary optical brighteners. They do not lead to a reduction in whiteness, as, for example, conventional wet-strength agents based on epichlorohydrin do. Furthermore, a soft handle of the paper can be achieved for use in the hygiene paper sector. When employed by coating, the dispersions according to the invention result in an increase in whiteness of about 1–10%.

The preparation applied improves the use properties of paper, in particular the writing properties, the printability, the strength and the tendency to form dust, and leads to a reduced absorption of water and to a positive influencing of the whiteness. The effects can be measured above all as the $Cobb_{60}$ value, IGT picking test, strength testing and as the ink flotation test and drop test.

Unless stated otherwise, the percentage data of the following examples in each case relate to the weight; parts are parts by weight.

PREPARATION EXAMPLES

Polycyanate PI-1

0.08 equivalent of a monofunctional polyethylene oxide polyether started from methanol and having an average molecular weight of 350 is added at room temperature, while stirring, to 1.0 equivalent of a polyisocyanate based on 1,6-diisocyanatohexane (HDI), which contains isocyanurate groups and has an NCO content of 21.5% and a viscosity of 3,000 mPa.s (23° C.), and the mixture is then heated at 100° C. for 3–4 hours. If the NCO content does not reach the theoretical value, a catalyst (Desmorapid SO) is added and stirring is continued until the theoretical value is reached (IR control). After cooling to room temperature, a colourless clear polyisocyanate mixture is present. The NCO content is 17.3% and the viscosity is 3,050 mPa.s (23° C.).

8 parts of the polyisocyanate thus obtained are diluted with 2 parts of propylene glycol diacetate. An 80% strength solution having an NCO content of 12.6% and a viscosity of 510 mPa.s is obtained.

Polyisocyanate PI-2

87 g of a polyisocyanate which has been prepared by trimerization of some of the isocyanate groups of 1,6-diisocyanatohexane, contains isocyanurate groups, essentially comprises tris(6-isocyanatohexyl) isocyanurate and higher homologs thereof and has an NCO content of 21.4%, a content of monomeric 1,6-diisocyanatohexane of <0.3% and a viscosity of 3,000 mPa.s (23° C.) (NCO functionality about 4.0) is reacted with 13 g of a polyether based on ethylene oxide, which has been started from 2-(2-methoxyethoxy)ethanol and has a number-average molecular weight of 350 g/mol and a hydroxyl number of 160 mg of KOH/g (6 hours at 60° C.).

NCO content: 17.2%

Viscosity (23° C.): 3200 mPa.s

NCO functionality: about 3.5.

Polyisocyanate PI-3

85 g of a polyisocyanate which essentially comprises tris(6-isocyanatohexyl) isocyanurate and has an NCO content of 22.5% and a viscosity of 800 mPa.s are reacted with 15 g of the polyether employed in PI-2.

NCO content: 16.9%

Viscosity (23° C.): 1560 mPa.s

NCO functionality: about 3.2.

Polyisocyanate PI-4

83 g of a polyisocyanate which has been prepared by trimerization of some of the isocyanate groups of 1,6-diisocyanatohexane, contains isocyanurate groups, essentially comprises tris(6-isocyanatohexyl) isocyanurate and higher homologues thereof and has an NCO content of 21.4%, a content of monomeric 1,6-diisocyanatohexane of <0.3% and a viscosity of 3,000 mPa.s (23° C.) (NCO functionality about 4.0) are reacted for 6 hours at 60° C. with 17 g of a polyether based on ethylene oxide, which has been started from 2-(2-methoxyethoxy)ethanol and has a number-average molecular weight of 350 g/mol and a hydroxyl number of 160 mg of KOH/g, and 1 g of diethylaminoethanol. The product is employed as an 80% strength solution in 1,2-propylene glycol diacetate or in bulk.

NCO content: 14.9%

Viscosity (23° C.): 5800 mPa.s

NCO functionality: about 3.2

80% strength solution: 500 mPa.s at 23° C.

The Preparation of the Starch Solution (NP)

was carried out by continuous or discontinuous cooking and degradation of a natal starch under known conditions, for example at 130° C. or at ≦95° C. (with enzymes, for example). Thereafter, the formulation is diluted to a concentration of 5%.

In a separate working tank, the desired dispersion is prepared by mixing the polyisocyanates, the synthetic prepolymers and this starch solution.

Preparation of Polysiloxane Graft Copolymer SP-1 (According to Example 1 of EP 407 799)

A) 1550 g of octamethylcyclotetrasiloxane are initially introduced into an intensive-action dispersing vessel of 6 liter capacity fitted with two 10 mm dissolver discs. First 180 g of mercaptopropyl-methyldimethoxysilane and then 38 g of dodecylbenzenesulphonic acid are added, while stirring at 1000 revolutions/minute. After stirring for 5 minutes, a homogeneous mixture is formed. 2300 g of deionized water are then metered in over a period of 20 minutes, while stirring, and the mixture is subsequently stirred at room temperature for 1 hour. The resulting emulsion is then homogenized with the aid of a dispersing machine under 200 bar for 12 minutes. The emulsion is then transferred to a sulphonation beaker of 4 liter capacity fitted with a butterfly stirrer and is heated at 85° C. for 2.5 hours, while stirring at 170 revolutions/minute. After cooling to room temperature, the latex is brought to a pH of 9.25 by addition of 23.9 g of 5 N NaOH. A milky-white emulsion having a solids content of 38.1% by weight is obtained. This corresponds to a polymer conversion of about 90% by weight.

Particle size (laser scattered light method): 200 nm
low distribution range (K2 value): 0.034
gel content: about 48.5% by weight
content of Na dodecylbenzenesulphonate as an emulsifier: 1% by weight.

B) 485 g of the polysiloxane latex according to A) are initially introduced into a stirred vessel of 2 liter capacity fitted with a blade stirrer. 233 g of deionized water are added, while stirring at 200 revolutions/minute, and the vessel is flushed with nitrogen. A solution of 1.8 g of azo-bisisobutyronitrile in 180 g of styrene is added dropwise in the course of one hour, while stirring. The mixture is stirred at room temperature for 18 hours and the temperature is then increased to 60, 70 and 80° C. at hourly intervals. Finally, the latex is heated at 90° C. for 4 hours and cooled, while stirring. A viscous latex is obtained.

pH: 5.7
Solids content: 40.9% by weight

Preparation of Synthetic Polymer SP-1.2 (According to Example 2 of EP 407 799)

1635 g of a polysiloxane latex prepared as in Example SP-1.1, part A) and having a solids content of 37.7% are initially introduced into a stirred vessel of 4 liter capacity fitted with a blade stirrer. The latex comprises 600 g of polyorganosiloxane having a content of mercapto groups of about 2% and 16.2 g of Na dodecylbenzenesulphonate as the emulsifier. After dilution with 641 g of water, a mixture of 4 g of azobisisobutryonitrile, 400 g of styrene and 20 g of methacrylic acid is added dropwise in the course of one hour, while stirring under nitrogen. The mixture is stirred at room temperature for 18 hours and the temperature is then increased to 60, 70 and 80° C. at hourly intervals. Finally, the latex is heated at 90° C. for 4 hours and cooled, while stirring. A medium-viscosity latex is obtained.

pH: 5.4
Solids contents: 39.5% by weight.

Preparation of Synthetic Polymer SP 2.1

486 g of dimethyldiglycol are initially introduced into a 4 1 three-necked flask with a stirring, cooling and heating device, and are heated to 130° C. A mixture of 500 g of maleic anhydride, 400 g of styrene, 900 g of methyl methacrylate and 200 g of n-butyl acrylate is metered in over a period of 3 hours and, in parallel with this, 71 g of tert-butyl peroctoate (70% in a hydrocarbon mixture) is metered in over a period of 4 hours. After the mixture has been stirred for 1 hour, 5.6 g of tert-butyl peroctoate are added and the mixture is stirred again for 2 hours. 1200 g of ®Ocenol 110/130 (unsaturated fatty alcohol, Henkel) are then added and the reaction mixture is kept at 135° C. for 6 hours. 3700 g of this resin melt are dispersed in a water/ammonia mixture which has been heated to 45° C., and the mixture is stirred at 60° C. for 6 hours. 48 g of skin-prevention agent ®Ascinin R conc. (Bayer AG) are then also added to the aqueous resin dispersion and the dispersion is filtered.

The aqueous resin dispersion has a solids content of 43.5% and a pH of 6.2. The 100% pure resin has a content of structural units —O—R of 36% by weight and a content of free and neutralized carboxyl groups of, in total, 220 milliequivalents per 100 g of solid, the degree of neutralization being 20%.

Preparation of Synthetic Polymer SP-2.2

A mixture of 500 g of maleic anhydride, 400 g of styrene and 1100 g of methyl methacrylate is polymerized in xylene at 130° C. in the presence of 114 g of tert-butyl peroctoate (70% in a hydrocarbon mixture) in a 4 three-necked flask with a stirring, cooling and heating device. After 1 hour at 130° C., a further 5.6 g of tert-butyl peroctoate are added, the mixture is stirred for 2 hours, 1200 g of Ocenol 110/130 (Henkel) are added and the mixture is stirred at 135° C. for a further 6 hours. 27.5 g of ethanol are then added and the mixture is kept at 120° C. for 1 hour. 341 g of the glycidyl ester of versatic acid (®Cardura E 10, Shell Chemie) and 3.6 g of triethylbenzylammonium chloride, as well as 5%, based on the solid resin, of methoxypropanol are then added. The mixture is subsequently stirred at 90° C. until the total acid number is constant.

The resin melt thus obtained is stirred into an aqueous $NH_3$ solution which has been heated to 50° C. After the mixture has been stirred at 60° C. for 4 hours, 54 g of butanone oxime are added and the mixture is filtered. The solvent is then distilled off in vacuo.

The aqueous resin dispersion has a solids content of 38.0% and a pH of 6.5. The 100% pure resin has a content of structural units —O—R of 34% by weight and a content of free and neutralized carboxyl groups of, in total, 141 milliequivalents per 100 g of solid, the degree of neutralization being 32%.

Preparation of the Cationic Vinyl Polymer Dispersions, Containing Hydroxyl Groups, SP-3.1 to SP-3.5

Initial mixture I (cf. Table 1) is initially introduced into a 1 liter stirred flask with a stirrer having a good action, gas inlet and gas discharge, and is flushed thoroughly with nitrogen. Nitrogen is then passed over and the mixture is heated to an internal temperature of 70° C. Thereafter, mixtures II and III (cf. Table 1) are metered into the initial mixture 1 simultaneously and uniformly in the course of 2 hours. The mixture is subsequently stirred for I hour and post-activator solution IV is then added. The mixture is then subsequently stirred for 3 hours. About 100 ml of water and residual monomers are then distilled off under a water pump vacuum of about 200 to 400 mbar. Thereafter, the mixture is cooled and filtered.

The physico-chemical characteristics of the aqueous dispersions are likewise shown in Table 1.

TABLE 1

|  | SP-3.1 | SP-3.2 | SP-3.3 | SP-3.4 | SP-3.5 |
| --- | --- | --- | --- | --- | --- |
| I. Initial mixture |  |  |  |  |  |
| Emulsifier Dehyquart A[1]) (25% strength) | 16 g | 48 g | 48 g | 48 g | 48 g |
| Deionized water | 453 g | 429 g | 429 g | 429 g | 429 g |
| II. Monomer mixture |  |  |  |  |  |
| Acrylonitrile | 86.5 g | 82.5 g | 58.3 g | 43.8 g | 35 g |
| n-Butyl acrylate | 86.5 g | 82.5 g | 116.7 g | 131.3 g | 140 g |
| Hydroxypropyl methacrylate | 17 g | 17 g | 17 g | 17 g | 17 g |
| Polyether LB 25[2)] | 5.4 g | 5.4 g | 5.4 g | 5.4 g | 5.4 g |
| Emulsifier L 10[3)] | 0.6 g | 0.6 g | 0.6 g | 0.6 g | 0.6 g |
| III. Initiator solution |  |  |  |  |  |
| Hydrogen peroxide, 35% strength | 4 g | 4 g | 4 g | 4 g | 4 g |
| Deionized water | 120 g | 120 g | 120 g | 120 g | 120 g |

TABLE 1-continued

|  | SP-3.1 | SP-3.2 | SP-3.3 | SP-3.4 | SP-3.5 |
|---|---|---|---|---|---|
| IV. Post-activator solution | | | | | |
| Hydrogen peroxide, 35% strength | 1 g | 1 g | 1 g | 1 g | 1 g |
| Deionized water | 10 g | 10 g | 10 g | 10 g | 10 g |
| Concentration [% by weight] | 22.4 | 21.2 | 21.8 | 23.5 | 25.4 |
| pH | 6.2 | 6.0 | 6.3 | 5.8 | 5.0 |
| Viscosity at 22° C. [mPa · s] | <100 | <100 | <100 | <100 | <100 |
| Average particle size [nm], laser correlation spectroscopy | 85 | 63 | not measured | not measured | not measured |

[1])Cetyl-trimethyl-ammonium chloride
[2])Copolyether of ethylene oxide/propylene oxide, Mn = 2250 g/mol
[3])Nonionic emulsifier from lauryl alcohol + 10 mol of ethylene oxide Preparation of the Cationic Vinyl Polymer Dispersions, Containing Hydroxyl Groups, SP-3.6 to SP-3.9

Initial mixture I (cf. Table 2) is initially introduced into a 1 liter stirred flask with a stirrer having a good action, gas inlet and gas discharge, and is flushed thoroughly with nitrogen. Nitrogen is then passed over and the mixture is heated to an internal temperature of 70° C. Thereafter, mixtures II and III (cf. Table 2) are metered into the initial mixture 1 simultaneously and uniformly in the course of 2 hours. The mixture is subsequently stirred for 1 hour and post-activator solution IV is then added. The mixture is then subsequently stirred for 3 hours. About 100 ml of water and residual monomers are then distilled off under a water pump vacuum of about 200 to 400 mbar. Thereafter, the mixture is cooled and filtered.

The physico-chemical characteristics of the aqueous dispersions are likewise shown in Table 2.

TABLE 2

|  | SP-3.6 | SP-3.7 | SP-3.8 | SP-3.9 |
|---|---|---|---|---|
| I. Initial mixture | | | | |
| Emulsifier Dehyquart A[1]) (25% strength) | 48 g | 48 g | 48 g | 48 g |
| Deionized water | 429 g | 429 g | 429 g | 429 g |
| II. Monomer mixture | | | | |
| Styrene | 77.1 g | 60.1 g | — | — |
| Methyl methacrylate | — | — | 77.1 g | 60.1 g |
| n-Butyl acrylate | 77.1 g | 60.1 g | 77.1 g | 60.1 g |
| Hydroxypropyl methacrylate | 33.9 g | 67.8 g | 33.9 g | 67.8 g |
| Polyether LB 25[2]) | 5.4 g | 5.4 g | 5.4 g | 5.4 g |
| Emulsifier L 10[3]) | 0.6 g | 0.6 g | 0.6 g | 0.6 g |
| III. Initiator solution | | | | |
| Hydrogen peroxide, 35% strength | 5 g | 5 g | 5 g | 5 g |
| Deionized water | 120 g | 120 g | 120 g | 120 g |
| IV. Post-activator solution | | | | |
| Hydrogen peroxide, 35% strength | 2 g | 2 g | 2 g | 2 g |
| Deionized water | 10 g | 10 g | 10 g | 10 g |
| Concentration [% by weight] | 28.8 | 27.6 | 28.7 | 26.0 |
| pH | 4.6 | 4.6 | 4.7 | 4.6 |
| Viscosity at 22° C. [mPa · s] | <100 | <100 | <100 | <100 |
| Average particle size [nm], laser correlation spectroscopy | 51 | 70 | 80 | 228 |

[1])Cetyl-trimethyl-ammonium chloride
[2])Copolyether of ethylene oxide/propylene oxide, Mn = 2250 g/mol
[3])Nonionic emulsifier from lauryl alcohol + 10 mol of ethylene oxide Preparation of the Cationic Polymer Dispersion, Containing Hydroxyl Groups, SP-3.10

A polyamide-amine condensate of adipic acid and diethylenetriamine in a molar ratio of 1.0:1.05 was prepared by melt polycondensation. The product was dissolved in water and subjected to a condensation reaction, at a concentration of 25%, with 0.05 mol of dichloroethane per mol of base nitrogen of the polyamide-amine at 125° C. under pressure. An end product having a viscosity of 200 mPa.s at 25° C. and a concentration of 25% is obtained. The product thus obtained was alkylated with propylene oxide with the result that about 90% of the amino groups were converted into tertiary amino groups.

USE EXAMPLES/SURFACE USE

The sizing action of the dispersions according to the invention was tested on filler-free and also on filled paper.
Paper Base Recipe
50 parts of birch sulphate pulp
50 parts of pine sulphate pulp, degree of fineness: 35–45° SR
0.2% of retention agent based on polyamide-amine (for example 25% strength Retaminol C01)
30% of filler employed as required, weight per unit area 75 to 80 g/m².
Paper 1 50% of softwood pulp, 50% of hardwood pulp, pH in the headbox: 7.2; degree of fineness: 35° SR; wet pick-up in a laboratory sizing press: about 80% by weight; weight per unit area: 80 g/m².
Paper 2 as paper 1, but with an initial amount of 30% of titanium dioxide, ash content: 19.3%
Paper 3 as paper 1, but with an initial amount of 30% of china clay, ash content: 16.7%.
Paper 4 as paper 1, but with an initial amount of 30% of chalk, ash content: 16.8%.
Paper 5 as paper 3, but with an initial amount of 10% of china clay, ash content: 7%.
Paper 6 as paper 3, but with an initial amount of 40% of china clay, ash content: 23%

The papers were sized on a laboratory sizing press from Mathis, Zurich, Switzerland, model HF. A dispersion of y parts of commercially available starch and x parts—calculated as the active substance—of polyisocyanate P I and z parts of the synthetic polymer, topped up to 100 parts with water, was used as the sizing liquor. The surface-sized papers were dried on a drying cylinder at about 100° C. in the course of one minute. Before the sizing test, the papers were conditioned at room temperature for 2 hours.

To evaluate the degree of sizing of the surface-sized papers, the Cobb values (according to DIN 53 132) were determined and ink flotation tests (IFT) were carried out. For the ink flotation tests, the papers were cut into strips of 3 cm in width and 3 cm in length and placed on blue test ink (DIN 53 126) at 22° C. After test periods which differed for the individual types of paper, the paper samples were removed from the ink, squeezed off on the reverse on blotting paper and evaluated visually after 5 minutes. For qualitative determination of the penetration of ink through the paper and therefore the degree of sizing, the samples were rated with numbers 1 to 5, the numbers individually meaning:

1 no ink penetration 2 5 to 10% ink penetration 3 10 to 20% ink penetration 4 about 50% ink penetration 4.5*) about 90% ink penetration 5 100% ink penetration

*) Other intermediate values can also be used.

The following tables show the effectiveness of the dispersions according to the invention using the example of the sizing effects and wet-strength effects on various types of paper (base paper).

The procedure for the drop test is as follows:

One drop (0.05 ml) of water is placed on the surface of each of the treated papers at room temperature. The time taken for the drop to be absorbed completely is measured, up to a maximum of 180 minutes.

The dry and wet breaking loads were determined in accordance with the customary DIN standards.

In the following examples, the parts of the products employed relate to parts of active substance in 100 parts of liquor.

EXAMPLES 1 AND 2

Finishing of Paper 1

Surface application on the sizing press: wet pick-up about 80%

| Example | Poly-isocyanate* x parts/ 100 parts | Starch* y parts/ 100 parts | Synthetic polymer* z parts/ 100 parts of liquor | Cobb$_{60}$ value [g/m$^2$] | IFT |
|---|---|---|---|---|---|
| 1 | 0.5 part PI-4 | — | 0.2 SP-1.2 | 15 | 1 |
| 2 | 0.5 part PI-1 | — | 0.2 SP-1.2 | 19 | 1 |
| Comparison | 1.0 PI-4 | — | — | 75 | 5 |
| " | 1.0 PI-1 | — | — | 74 | 5 |
| " | — | — | 0.4 SP-1.2 | 69 | 4.5 |
| " | — | 1.0 Starch | — | 77 | 5 |
| " | — | 0.5 Starch | 0.5 SP-1.2 | 72 | 5 |
| " | 0.5 PI-4 | 0.5 Starch | — | 75 | 5 |
| " | 0.5 PI-I | 0.5 Starch | — | 81 | 5 |

*Figures in parts of active substance in 100 parts of the resulting liquor

A natural maize starch was used as the starch.

EXAMPLES 3–8

Finishing of Paper 1

Surface Application by Sizing Press

| Example No. | Poly-isocyanate PI-4 x parts | Naturally occurring polymer NP y parts | Polysiloxane graft copolymer SP-1.2 z parts | Cobb$_{60}$ value [g/m$^2$] | Drop test [minutes] |
|---|---|---|---|---|---|
| 3 | 0.72 | — | 0.04 | 22.0 | — |
| 4 | 0.64 | — | 0.08 | 15.8 | — |
| 5 | 0.48 | — | 0.16 | 13.8 | — |
| 6 | 0.32 | — | 0.24 | 13.8 | — |
| 7 | 0.16 | — | 0.32 | 14.5 | — |
| 8 | 0.08 | — | 0.36 | 16.1 | — |

EXAMPLE 9

Treatment of Filled Papers

Surface Application of the Dispersions from PI-4 and SP-1.2

Amount employed: 0.4 part of PI-4+0.2 part of SP-1.2 (active substance) per 100 parts of liquor.

The following table shows the Cobb values of untreated test sheets (1st column) and test sheets subjected to condensation at 110° C. (2nd column).

| Base paper filler | Paper 1 None (66% wet pick-up) 9a | | Paper 2 Titanium dioxide (70% wet pick-up) 19.3% ash 9b | | Paper 3 China clay (68% wet pick-up) 16.7% ash 9c | | Paper 4 Chalk (68% wet pick-up) 16.8% ash 9d | |
|---|---|---|---|---|---|---|---|---|
| Example Cobb 60 | untreated | 10 min 110° C. | untreated | 10 min 110° C. | untreated | 10 min 110° C. | untreated | 10 min 110° C. |
| after 2 h | 23.4 | 16.6 | 82.6 | 83.6 | 77.6 | 68.6 | 50.8 | 25.4 |
| after 4 h | 19.1 | 15.7 | 77.3 | 79 | 67.9 | 60 | 47.7 | 23.3 |
| after 24 h | 15.9 | 14.8 | 86 | 79 | 65 | 66.5 | 37.5 | 26.1 |

-continued

| Base paper filler | Paper 1 None (66% wet pick-up) 9a | | Paper 2 Titanium dioxide (70% wet pick-up) 19.3% ash 9b | | Paper 3 China clay (68% wet pick-up) 16.7% ash 9c | | Paper 4 Chalk (68% wet pick-up) 16.8% ash 9d | |
|---|---|---|---|---|---|---|---|---|
| Example Cobb 60 | untreated | 10 min 110° C. | untreated | 10 min 110° C. | untreated | 10 min 110° C. | untreated | 10 min 110° C. |
| after 48 h | 13.6 | 12.4 | 74.5 | 65 | 49 | 60 | 29.2 | 18.8 |
| after 3 days | 15 | 13.4 | 69.5 | 72.6 | 58.5 | 57 | 31.6 | 23.6 |
| after 6 days | 15.4 | 12.6 | 69 | 61 | 56.5 | 57 | 31.9 | 20.9 |

This example shows that china clay and titanium dioxide impair the sizing, while with chalk-containing paper similarly good sizing effects to those with non-filled paper are achieved.

EXAMPLE 10

On paper 1, with surface use of a liquor which comprises 5 parts of commercially available potato starch (Avebe) Perfectamyl A 4692 and 0.1 part of active compound of a commercially available cationic polymer sizing agent (Baysynthol KSN), a $Cobb_{60}$ value of 20 $g/m^2$ at a wet pick-up of 70% is obtained.

If a liquor comprising 5 parts of starch Perfectamyl A 4692, 0.2 part of polyisocyanate PI-4 and 0.1 part of synthetic polymer SP-1.2 is employed, a $Cobb_{60}$ value of 15 $g/m^2$ at the same wet pick-up is obtained.

To achieve this Cobb value with a polymer sizing agent (Baysynthol KSN) alone, 0.4 part of Baysynthol KSN (active substance) is required.

EXAMPLE 11

If a maize starch liquor of 5 parts of oxidatively degraded maize starch (Cerestar), 0.10 part of polyisocyanate PI-4 and 0.06 part of synthetic polymer SP-1.2 is used analogously to Example 10, a Cobb60 value of 14 $g/m^2$ is obtained. This effect is achieved only if 0.25% of the active substance Baysynthol KSN is employed.

EXAMPLES 12 AND 13

Finishing of Paper 1

Surface application on the sizing press: wet pick-up about 80%

| Example | Poly-isocyanate* x parts/ 100 parts | Starch* y parts/ 100 parts | Synthetic polymer* z parts/ 100 parts of liquor | $Cobb_{60}$ value [$g/m^2$] | IFT |
|---|---|---|---|---|---|
| 12 | 0.5 part PI-4 | — | 0.19 SP-2 | 16 | 1 |
| 13 | 0.5 part PI-1 | — | 0.19 SP-2 | 18 | 1 |
| Comparison | 1.0 PI-4 | — | — | 75 | 5 |
| " | 1.0 PI-1 | — | — | 74 | 5 |
| " | — | — | 0.38 SP-2 | 60 | 4.5 |
| " | — | 1.0 Starch | — | 77 | 5 |
| " | — | 0.5 Starch | 0.5 SP-2 | 75 | 5 |
| " | 0.5 PI-4 | 0.5 Starch | — | 75 | 5 |
| " | 0.5 PI-1 | 0.5 Starch | — | 81 | 5 |

*Figures in parts of active substance in 100 parts of the resulting liquor

A natural maize starch was used as the starch.

EXAMPLES 14–24

Finishing of Paper 1

A degraded potato starch was used as the naturally occurring polymer.

Surface Application

| Example No. | Poly-isocyanate PI-4 x parts | Naturally occurring polymer NP y parts | Synthetic polymer SP-2.2 z parts | $Cobb_{60}$ value [$g/m^2$] | Drop test [minutes] |
|---|---|---|---|---|---|
| 14 | 0.72 | — | 0.038 | 22.6 | — |
| 15 | 0.64 | — | 0.076 | 19.9 | — |
| 16 | 0.48 | — | 0.152 | 14.0 | — |
| 17 | 0.32 | — | 0.228 | 14.2 | — |
| 18 | 0.16 | — | 6.304 | 16.0 | — |
| 19 | 0.08 | — | 0.342 | 18.3 | — |
| 20 | 0.05 | 5 or 2.5 | — | — | 12 or 5 |
| 21 | 0.1 | 5 or 2.5 | — | — | 34 or 9 |
| 22 | 0.2 | 5 or 2.5 | — | — | 38 or 15 |
| 23 | 0.4 | 5 or 2.5 | — | — | 17 or 13 |
| 24 | 0.8 | 5 or 2.5 | — | — | 8 or 7 |
| Comparison (polyamide-amine-epichlorohydrin resin) + 5 parts of NP | | | | | 4 |

EXAMPLE 25

Treatment of Filled Papers

Surface application of the dispersions from PI-4 and SP-2.2

The following example shows that china clay impairs sizing, but chalk is considerably more favourable than china clay, in particular at a ratio of 0.4 part of PI-4 to 0.19 part of SP-2.2.

Amount employed in the liquor: 0.4 part of PI-4+0.19 part of SP-2.2 (active substance)

The Cobb values of untreated test sheets (1st column) and test sheets subjected to condensation at 110° C. (2nd column) are shown in the table.

5 parts of starch Perfectamyl A 4692,
0.20 part of polyisocyanate PI-4 and
0.11 part of synthetic polymer SP-2.2,
while cationic and anionic polymeric sizing agents gave $Cobb_{60}$ values of only $\geq 30$ or $\geq 80$ g/m².

| Base paper filler | Paper 1 None (66% wet pick-up) 25 a | | Paper 2 Titanium dioxide (70% wet pick-up) 19.3% ash 25 b | | Paper 3 China clay (68% wet pick-up) 16.7% ash 25 c | | Paper 4 Chalk (68% wet pick-up) 16.8% ash 25 d | |
|---|---|---|---|---|---|---|---|---|
| Example Cobb 60 | untreated | 10 min 110° C. | untreated | 10 min 110° C. | untreated | 10 min 110° C. | untreated | 10 min 110° C. |
| after 2 h | 19.3 | 16.8 | 84.6 | 81.5 | 75 | 62.5 | 46.5 | 18.8 |
| after 4 h | 17.9 | 17 | 84.3 | 80.5 | 68.5 | 61 | 36 | 17.5 |
| after 24 h | 15.7 | 14.3 | 82.3 | 75 | 66.5 | 59 | 21.8 | 16.7 |
| after 48 h | 13 | 11.3 | 61 | 58 | 52 | 53 | 14.6 | 11.9 |
| after 3 days | 13.5 | 13.2 | 72.5 | 69 | 55.5 | 51 | 15.7 | 12.3 |
| after 6 days | 13.2 | 13.8 | 59.5 | 69 | 57.5 | 57.6 | 15.4 | 13.4 |

The example shows that on chalk-containing paper, similarly good sizing effects to those with non-filled paper are achieved.

EXAMPLE 26

On paper 1, with a surface use of a liquor which comprises 5 parts of commercially available potato starch (Avebe) Perfectamyl A 4692 and 0.1 part of active compound of a commercially available cationic polymer sizing agent (Baysynthol KSN), a $Cobb_{60}$ value of 20 g/m² at a wet pick-up of 70% is obtained.

If a liquor comprising 5 parts of starch Perfectamyl A 4692,
0.20 part of polyisocyanate PI-4 and
0.11 part of synthetic polymer SP-2.2 is employed, a $Cobb_{60}$ value of 13 g/m² is obtained.

To achieve this Cobb value with a customary polymer sizing agent (Baysynthol KSN), 0.4 part of Baysynthol KSN (active substance) is required.

EXAMPLE 27

If a maize starch liquor of 5 parts of oxidatively degraded maize starch,
0.10 part of polyisocyanate PI-4 and
0.06 part of synthetic polymer SP-2.2 is used analogously to Example 26, a $Cobb_{60}$ value of 17 g/m² is obtained; this effect is achieved only if 0.25% of the active substance Baysynthol KSN is employed.

EXAMPLE 28

A $Cobb_{60}$ value of 21 g/m² is also achieved in filler-containing paper 4 with an ash content of 16.8% of chalk, at a wet pick-up of 68%, with a liquor of

EXAMPLE 29

By using oxidatively degraded maize starch instead of Perfectamyl A 4692 and working analogously to Example 28, with the same amount employed (wet pick-up 66%), Cobb values of even <16 g/m² were achieved, while the polymeric sizing agents of the prior art showed no adequate sizing (Cobb values).

EXAMPLE 30

A paper 3 with 16.7% of china clay was treated analogously to Example 28 (wet pick-up=68%) and gave Cobb values of 30 g/m², with the same liquor composition, compared with 50 g/m² with a commercially available cationic polymer sizing agent according to the prior art.

EXAMPLE 31

Treatment of paper analogously to Example 30 with the liquor from Example 29 gave a $Cobb_{60}$ value of 20 g/m².

EXAMPLE 32

Surface Treatment of Papers 5 and 6 by Means of a Sizing Press

Various dispersions are compared with one another in this example (amount employed in %, based on the sizing press liquor).

| | | Paper 5 Weight per unit area: 70 g/m² 10% of clay, 7% of ash Wet pick-up 95% | | | Paper 6 Weight per unit area: 90 g/m² 40% of clay, 23% of ash Wet pick-up 90% | | |
|---|---|---|---|---|---|---|---|
| Liquor | Polyisocyanate | Drop Test | Breaking load [N] | | Drop test | Breaking load [N] | |
| Starch or synthetic polymer | I | [min:s] | dry | wet | [min:s] | dry | wet |
| *5.0% of Cerestar maize starch | 0.25% of PI-4 | >15:00 | 49.5 | 5.1 | 06:13 | 51.8 | 4.6 |
| Comparison 5.0% of Emsol K85[1)] | — | 00:41 | 53.5 | 0.5 | 02:02 | 46.8 | 0.5 |
| *5.0% of Emsol K85 | 0.25% of PI-1 | 13:12 | 53.5 | 4.2 | 03:58 | 47.2 | 3.3 |
| *5.0% of Emsol K85 | 0.25% of PI-4 | 12:10 | 47.3 | 4.4 | 03:56 | 46.9 | 3.5 |
| — | 0.25% of PI-1 | 01:00 | 35.3 | 8.6 | 01:36 | 33.2 | 4.2 |
| — | 0.25% of PI-4 | 02:10 | 38.9 | 8.3 | 01:23 | 30.9 | 4.0 |
| *0.07% of SP-2.1 | 0.15% of PI-4 | 02:00 | 36.3 | 4.1 | 01:33 | 31.7 | 2.5 |
| *0.11% of SP 2.1 | 0.25% of PI-4 | 03:28 | 40.2 | 8.7 | 03:15 | 31.3 | 4.0 |
| *0.22% of SP-2.1 | 0.50% of PI-4 | >15:00 | 42.3 | 11.6 | 06:59 | 24.6 | 6.1 |

*examples according to the invention
[1)]water-soluble hydroxypropyl ether based on potato starch

EXAMPLE 33

Combination of Polyisocyanate with Various Types of Starch

Surface treatment of paper 1, wet pick-up 75%. The wet breaking load was measured (by means of a tensile tester) on strips of paper kept in water for 5 minutes:

| | |
|---|---|
| 0.72% of PI-2 | 6.3 N |
| 0.72% of PI-2 + 2% of Cato 110 | 7.2 N |
| 0.72% of PI-2 + 2% of Amylex KLP 30 | 6.7 N |
| 0.72% of PI-2 + 2% of Perfectamyl A 4692 | 5.3 N |
| 0.72% of PI-2 + 2% of carboxymethylcellulose CMC/T 300 | 3.9 N |
| 0.5% of PI-3 | 7.0 N, Cobb value >80, dry breaking load 42.3 N |
| 0.5% of PI-3 + 0.2% of SP-2.2 | 6.4 N, Cobb value 22, dry breaking load 39.8 N |
| 0.5% of PI-3 + 0.2% of SP-2.2 + 2.5% of Perfectamyl A 4692 | 5.5 N, Cobb value 21, dry breaking load 47.2 N |

Use as a Wet-strength Agent for Paper

A mixture of 80% of bleached softwood chemical pulp and 20% of hardwood chemical pulp is beaten to a degree of freeness of $38°$ Schopper-Riegler in a beater at a pulp consistency of 2.5%. 100 g of this mixture are introduced into a glass beaker and diluted to 1000 ml with water.

A 1% strength cationic vinyl polymer dispersion which contains hydroxyl groups (products from Examples SP-3.1 to SP-3.9) [and/or a 1% strength dispersion of component PAdd and/or a 1% strength dispersion of component PCond] is added to this suspension, the amounts of active substance, based on the fibrous material, stated in Table 3 being employed for each component.

After 3 minutes at room temperature, a given amount of a 1% strength dispersion of polyisocyanate PI is added to the corresponding mixture. The amount employed is shown in Table 3 as % by weight of active substance, based on the fibrous material. The dispersion of the polyisocyanate was freshly prepared in each case. Water was employed as the dispersing medium. (In the case of polyisocyanates which contain no polyether groups, the polyisocyanate is emulsified in dilute acetic acid).

After a stirring time of 3 minutes, sheets of paper having a weight per unit area of about 80 g/m² are formed with the contents of the glass beakers on a sheet-forming machine (Rapid-Köthen apparatus). The sheets of paper are dried at 85° C. in vacuo under 20 mbar for 8 minutes and then subjected to aftercondensation in a drying cabinet at 110° C. for a further 10 minutes.

After the conditioning, 5 test strips of 1.5 cm width are cut out of each sheet of paper and immersed in distilled water for 5 minutes. Thereafter, the wet strips are immediately tested for their wet breaking load in a tensile tester. In the present examples, the wet breaking loads at the particular concentration employed were in each case based on the values (stated as the relative wet breaking load in %) obtained with polyisocyanate PI-4 without further additions with amounts employed of 0.3, 0.6 or 0.9% by weight of active substance (=100%).

The test results are shown in Table 3. The drastic increase in the wet strength values due to the use of the dispersions according to the invention can be seen.

TABLE 3

Results of wet strength testing [%]

| Amount of polyisocyanate PI-4 employed | SP-3.1 | SP-3.2 | SP-3.3 | SP-3.4 | SP-3.5 |
|---|---|---|---|---|---|

TABLE 3-continued

Results of wet strength testing [%]

| | | Amount of SP employed = 1% | | | |
|---|---|---|---|---|---|
| 0.3% | 85.5 | 111.8 | — | — | — |
| 0.6% | 80.9 | 132.7 | — | — | — |
| 0.9% | 83.9 | 111.2 | — | — | — |
| | | Amount of SP employed = 2% | | | |
| 0.3% | 134.5 | 187.3 | 142.1 | 124.3 | 119.6 |
| 0.6% | 119.1 | 155.6 | 125.0 | 117.3 | 113.5 |
| 0.9% | 128.3 | 128.8 | 107.1 | 106.6 | 104.0 |
| | | Amount of SP employed = 4% | | | |
| 0.3% | 163.6 | 200.9 | 190.7 | 181.3 | 197.2 |
| 0.6% | 142.6 | 166.7 | 148.1 | 148.1 | 153.8 |
| 0.9% | 112.7 | 143.9 | 144.9 | 129.3 | 125.3 |

| Amount of polyisocyanate PI-4 employed | SP-3.6 | SP-3.7 | SP-3.8 | SP-3.9 |
|---|---|---|---|---|
| | Amount of SP employed = 1% | | | |
| 0.3% | 67.6 | 134.6 | 124.1 | 85.5 |
| 0.6% | 68.0 | 131.4 | 128.5 | 90.2 |
| 0.9% | 83.8 | 129.8 | 128.8 | 109.9 |
| | Amount of SP employed = 2% | | | |
| 0.3% | 105.6 | 142.9 | 144.4 | 128.3 |
| 0.6% | 125.2 | 136.6 | 141.9 | 120.2 |
| 0.9% | 110.6 | 130.3 | 127.8 | 118.2 |
| | Amount of SP employed = 4% | | | |
| 0.3% | 164.8 | 154.1 | 157.1 | 130.1 |
| 0.6% | 145.8 | 143.6 | 135.5 | 131.3 |
| 0.9% | 125.8 | 131.6 | 136.9 | 121.4 |

SP-3.10

The hydroxy-functional polyamide-amine condensate is outstandingly suitable as a component for the dispersion according to the invention. The wet strength is increased by 60%, compared with the pure polyisocyanate PI-1.

Use conditions: 0.3% by weight of PI-1+2% by weight of polyamide-amine condensate.

We claim:

1. A composition comprising
   (I) a polyisocyanate which has
      α) a content of isocyanate groups of 10–700 milliequivalents per 100 g of polyisocyanate,
      β) an average NCO functionality of $\geq 1.0$,
      γ) a content of ethylene oxide units of 0 to 30% by weight, based on the polyisocyanate, the polyethylene oxide chain having an average molecular weight (number-average) of 100–3500, and
      δ) a content of tertiary amino groups and/or ammonium groups of 50–5000 milliequivalents per 100 g of polyisocyanate,
   and at least one member selected from the group consisting of
   (II) a naturally occurring polymer selected from the group consisting of
      starch, cellulose, hemicellulose, chitosans, xanthans, agar, galactomannans, carrageenan, pectin, aligantes, plant gum and derivatives thereof,
   (III) a polysiloxane graft copolymer of
      a) 40 to 70% by weight of a polysiloxane, as the graft substrate, terminated by hydroxyl groups and containing v mol % of recurring units of the formula

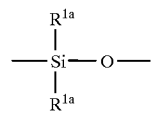

and w mol % of recurring units of the formula

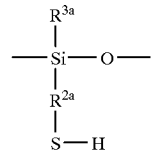

wherein $R^{1a}$ represents alkyl radicals having 1 to 24 C atoms or aryl radicals having 6 to 10 C atoms, $R^{2a}$ represents unbranched or branched alkylene radicals having 1 to 8 C atoms and $R^{3a}$ represents alkyl radicals having 1 to 24 C atoms, aryl radicals having 6 to 10 C atoms, alkoxy radicals having 1 to 6 C atoms or a hydroxyl group or $R^{2a}$ and $R^{3a}$, together with the Si atom, form a trivalent 5- or 6-membered ring with an unbranched or branched alkylene radical having 4 to 8 C atoms and v is 80 to 99 mol % and w is 1 to 20 mol % where v+w gives 100 mol %, and the viscosity, measured at 25° C., of the OH-terminated polysiloxane is between 100 and 100,000 mPa.s, and (b) 30 to 60% by weight of graft monomers selected from the group consisting of styrene, α-methylstyrene, (meth)acrylic acid esters, (meth) acrylonitrile and mixtures of these monomers, one or more vinyl monomers of the formula

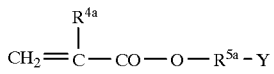

or

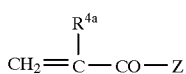

wherein $R^{4a}$ represents an H atom or a methyl group, $R^{5a}$ represents an unbranched or branched alkylene group having 1 to 18 C atoms, Y represents an H atom or the groups —OH or $C_1$–$C_4$-alkoxy and Z represents a group —OH or —$NR_2^{4a}$, (IV) a water-dilutable synthetic polymer obtainable by polymerization of olefinically unsaturated dicarboxylic acid anhydrides with other unsaturated monomers, structural units of the formula

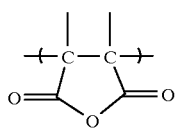

being formed, b) subsequent partial reaction with a monohydric alcohol R—OH (2 to 50%) and c) reaction of the COOH groups obtained in b) with an epoxide compound to the extent of 10–95% and neutralization of the remaining COOH groups with a base, and (V) a cationic polymer containing hydroxyl groups, obtainable by polymerization of monomer mixtures of a) at least 5% by weight of styrene and/or α-methylstyrene, methacrylonitrile, acrylonitrile or mixtures of these monomers, b) at least 5% by weight of (meth)acrylic acid esters of monofunctional alcohols having 1 to 12 C atoms, c) 0.1 to 35% by weight of one or more vinyl monomers of the formula

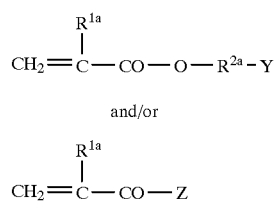

and/or wherein $R^{1a}$ represents an H atom or a methyl group, $R^{2a}$ represents an unbranched or branched alkylene radical having 1 to 18 C atoms, Y represents an H atom or the groups —$OR^{5a}$ and Z represents a group —OH or —$NR^{3a}R^{4a}$, wherein $R^{3a}$, $R^{4a}$ and $R^{5a}$ represent hydrogen or an alkyl radical having 1 to 4 C atoms and the sum of a)+b)+c) is 100% by weight, or said polyisocynate and said naturally occurring polymer and at least one member selected from the group consisting of said polysiloxane graft copolymer, said water-dilutable synthetic polymer and said cationic polymer.

2. Composition according to claim 1 in the form of aqueous dispersions.

3. Process for finishing paper, characterized in that cellulose-containing material is treated with a composition according to claim 1, it being possible for the individual components to be metered in independently of one another.

4. Paper finished by the process according to claim 3.

* * * * *

UNITED STATES PATENT AND TRADEMARK OFFICE
CERTIFICATE OF CORRECTION

PATENT NO. : 6,090,871
DATED : July 18, 2000
INVENTOR(S) : Jurgen Reiner

It is certified that error appears in the above-indentified patent and that said Letters Patent is hereby corrected as shown below:

Column 37, line 43,   cancel "Polycyanate PI - 1" and substitute
--Polyisocyanate PI – 1 --

Column 54, line 19,   cancel "polyisocynate" and substitute
--polyisocyanate--

Signed and Sealed this

Tenth Day of April, 2001

*Attest:*

NICHOLAS P. GODICI

*Attesting Officer*    *Acting Director of the United States Patent and Trademark Office*